United States Patent
Sambe

(10) Patent No.: US 11,257,060 B2
(45) Date of Patent: Feb. 22, 2022

(54) METHOD FOR PROCESSING A PURCHASE TRANSACTION USING A PLURALITY OF TRANSACTION SYSTEMS

(71) Applicant: TOSHIBA TEC KABUSHIKI KAISHA, Tokyo (JP)

(72) Inventor: Masanori Sambe, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/220,363

(22) Filed: Apr. 1, 2021

(65) Prior Publication Data

US 2021/0224775 A1    Jul. 22, 2021

Related U.S. Application Data

(63) Continuation of application No. 16/687,081, filed on Nov. 18, 2019, now abandoned, which is a
(Continued)

(30) Foreign Application Priority Data

Jan. 8, 2015 (JP) ................................ 2015-002392
Jan. 9, 2015 (JP) ................................ 2015-003431
(Continued)

(51) Int. Cl.
*G06Q 40/00* (2012.01)
*G06Q 20/20* (2012.01)
(Continued)

(52) U.S. Cl.
CPC ....... *G06Q 20/209* (2013.01); *G06F 16/9554* (2019.01); *G06K 7/1408* (2013.01);
(Continued)

(58) Field of Classification Search
CPC .. G06Q 20/209; G06Q 20/3276; G06Q 20/20; G06F 16/9554; G07G 1/0045; G07G 1/12; G07G 1/0072; G06K 7/1408
(Continued)

(56) References Cited

U.S. PATENT DOCUMENTS 8,589,259 B2   11/2013   Kunieda et al.
9,934,506 B2    4/2018   MacKinnon
(Continued)

FOREIGN PATENT DOCUMENTS

CN       103871179 A      6/2014
JP       2007-172559 A    7/2007
(Continued)

OTHER PUBLICATIONS

Japanese Notice of Reasons for Refusal dated Jan. 15, 2019 in counterpart Japanese Patent Application No. 2015-239946, 6 pages (with Translation).
(Continued)

*Primary Examiner* — Jamara A Franklin
(74) *Attorney, Agent, or Firm* — Kim & Stewart LLP

(57) ABSTRACT

A method of processing a purchase transaction includes generating a transaction file containing a product code, which is transmitted from a user computing device when an image of a product code identifier is captured by the user computing device, a first user ID of the customer, and an indicator of whether or not the customer has opted in to receive electronic receipts. The method further includes generating an electronic receipt based on the transaction file, storing a conversion table containing the first and second user IDs of the customer, converting the first user ID contained in the transaction file to the second user ID based on the conversion table, when the indicator indicates that the customer has opted in, and storing the electronic receipt in
(Continued)

association with the second user ID. The electronic receipt is transmitted in response to a request for electronic receipts associated with the second user ID.

20 Claims, 25 Drawing Sheets

Related U.S. Application Data continuation of application No. 16/042,315, filed on Jul. 23, 2018, now Pat. No. 10,482,448, which is a continuation of application No. 15/477,323, filed on Apr. 3, 2017, now Pat. No. 10,032,154, which is a continuation of application No. 14/988,406, filed on Jan. 5, 2016, now Pat. No. 9,619,976.

(30) Foreign Application Priority Data

May 25, 2015 (JP) .................................. 2015-105761
Dec. 9, 2015 (JP) .................................. 2015-239946

(51) Int. Cl.
| | |
|---|---|
| *G06F 16/955* | (2019.01) |
| *G07G 1/00* | (2006.01) |
| *G07G 1/12* | (2006.01) |
| *G06Q 20/04* | (2012.01) |
| *G06K 7/14* | (2006.01) |
| *G06Q 20/32* | (2012.01) |

(52) U.S. Cl.
CPC ........... *G06Q 20/047* (2020.05); *G06Q 20/20* (2013.01); *G06Q 20/3276* (2013.01); *G07G 1/0045* (2013.01); *G07G 1/0072* (2013.01); *G07G 1/12* (2013.01)

(58) Field of Classification Search
USPC ........................................................ 235/379
See application file for complete search history.

(56) References Cited

U.S. PATENT DOCUMENTS

| | | |
|---|---|---|
| 2012/0023016 A1 | 1/2012 | Babu |
| 2012/0084391 A1 | 4/2012 | Patel et al. |
| 2012/0284130 A1 | 11/2012 | Lewis et al. |
| 2014/0164193 A1 | 6/2014 | Ando et al. |
| 2014/0249951 A1 | 9/2014 | Gotanda et al. |
| 2015/0262157 A1 | 9/2015 | Chihara |
| 2015/0356549 A1 | 12/2015 | Patel et al. |
| 2018/0018739 A1 | 1/2018 | Ando et al. |
| 2021/0224774 A1* | 7/2021 | Schok .................. G06Q 20/346 |

FOREIGN PATENT DOCUMENTS

| | | |
|---|---|---|
| JP | 2008-217489 A | 9/2008 |
| JP | 2010-250798 A | 11/2010 |
| JP | 2011-070308 A | 4/2011 |
| JP | 2012-194959 A | 10/2012 |
| JP | 2013-041354 A | 2/2013 |
| JP | 2013-186875 A | 9/2013 |
| JP | 2014-520301 A | 8/2014 |
| JP | 2014-194731 A | 10/2014 |
| JP | 2014-194733 A | 10/2014 |
| JP | 2014-194761 A | 10/2014 |
| JP | 2015-032122 A | 2/2015 |
| WO | 2013/142209 A1 | 9/2013 |
| WO | 2014/057645 A1 | 4/2014 |

OTHER PUBLICATIONS

Chinese Third Office Action dated Feb. 3, 2020 in counterpart Chinese Patent Application No. 201610596076.4, 32 pages (with Translation).

Japanese Notice of Reasons for Refusal dated Jun. 23, 2020 in counterpart Japanese Patent Application No. 2019-059983, 7 pages (with Translation).

Japanese Notice of Reasons for Refusal dated Jun. 23, 2020 in counterpart Japanese Patent Application No. 2019-059984, 9 pages (with Translation).

Japanese Notice of Reasons for Refusal dated Sep. 23, 2020 in counterpart Japanese Patent Application No. 2019-129350, 6 pages (with Translation).

Japanese Notice of Reasons for Refusal dated Sep. 23, 2020 in counterpart Japanese Patent Application No. 2019-129351, 8 pages (with Translation).

Japanese Notice of Reasons for Refusal dated Sep. 23, 2020 in counterpart Japanese Patent Application No. 2019-129352, 8 pages (with Translation).

* cited by examiner

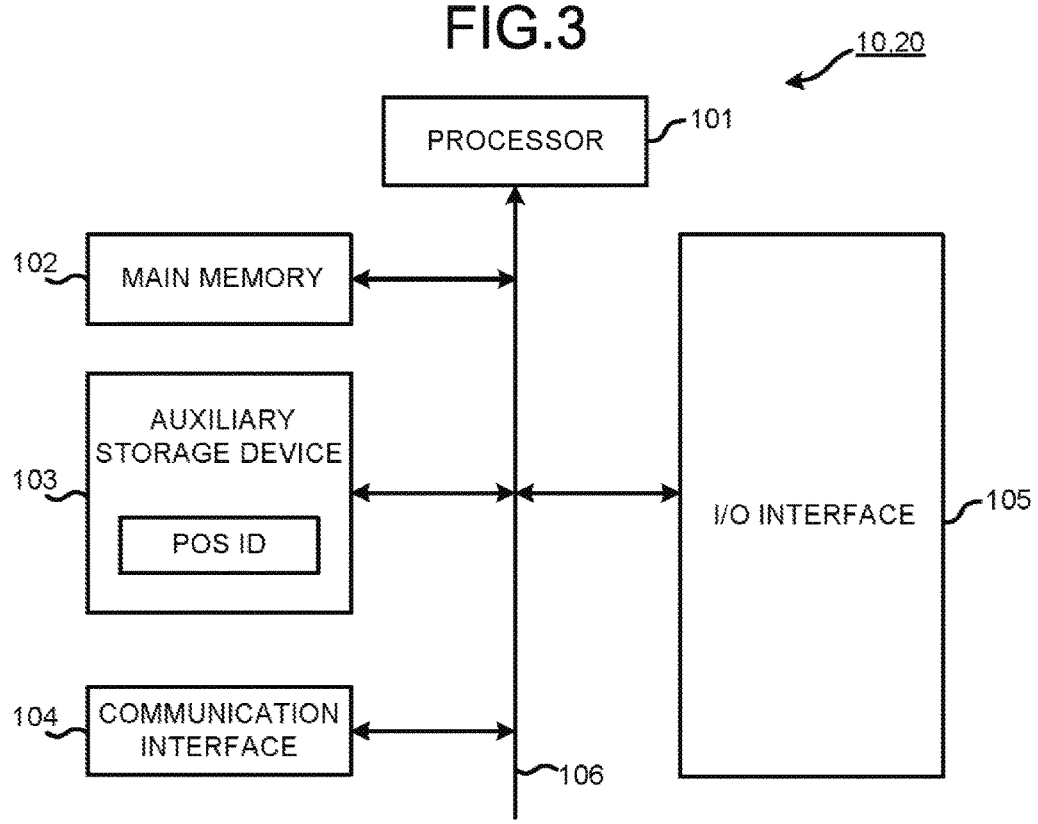
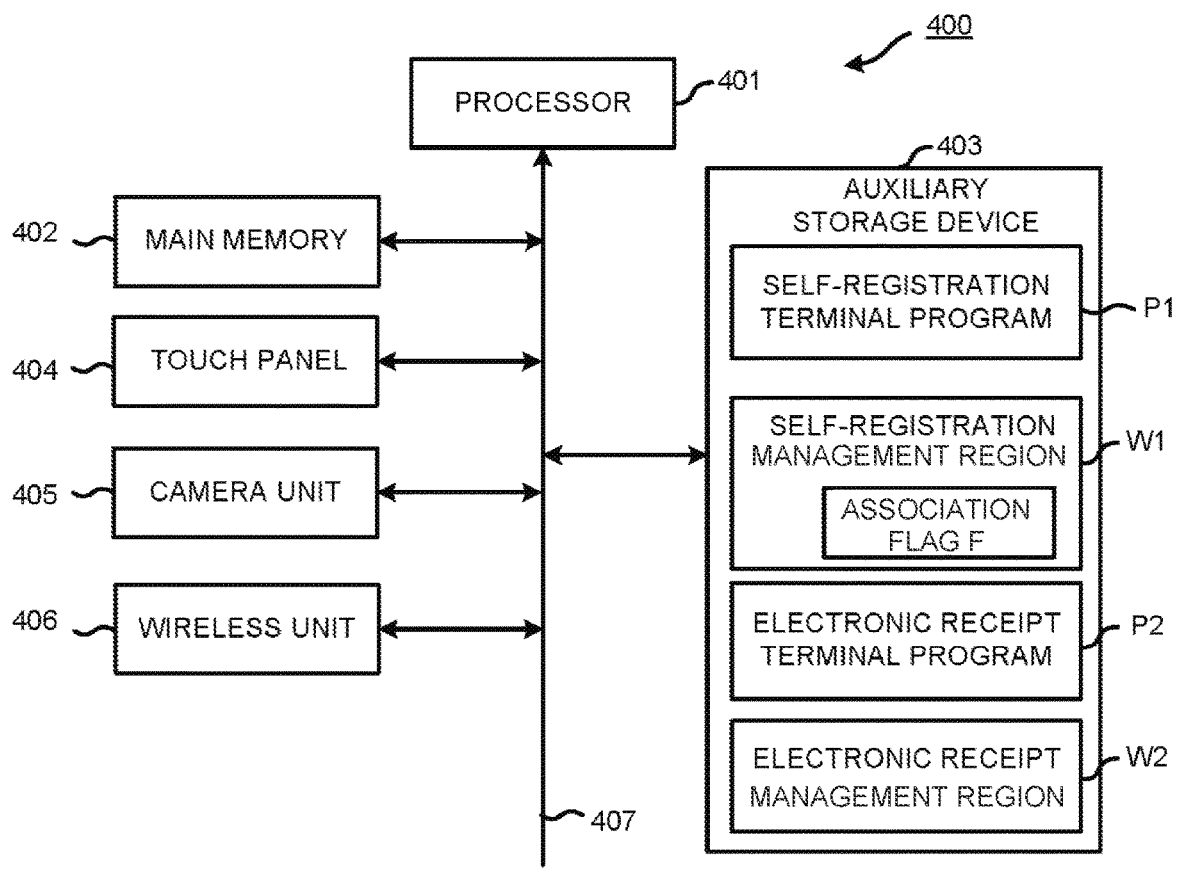

METHOD FOR PROCESSING A PURCHASE TRANSACTION USING A PLURALITY OF TRANSACTION SYSTEMS

CROSS-REFERENCE TO RELATED APPLICATIONS

This application is a continuation of U.S. patent application Ser. No. 16/687,081, filed on Nov. 18, 2019, which is a continuation of U.S. patent application Ser. No. 16/042,315, filed on Jul. 23, 2018, now U.S. Pat. No. 10,482,448, issued on Nov. 19, 2019, which is a continuation of U.S. patent application Ser. No. 15/477,323, filed on Apr. 3, 2017, now U.S. Pat. No. 10,032,154, issued on Jul. 24, 2018, which is a continuation of U.S. patent application Ser. No. 14/988,406, filed on Jan. 5, 2016, now U.S. Pat. No. 9,619,976, issued on Apr. 11, 2017, which is based upon and claims the benefit of priority from Japanese Patent Application No. 2015-002392, filed Jan. 8, 2015, Japanese Patent Application No. 2015-003431, filed Jan. 9, 2015, Japanese Patent Application No. 2015-105761, filed May 25, 2015, and Japanese Patent Application No. 2015-239946, filed Dec. 9, 2015; the entire contents of all of these applications are incorporated herein by reference.

FIELD

Embodiments described herein generally relate to a method for processing a purchase transaction using a plurality of transaction systems.

BACKGROUND

In the related art, a self-registration system is known as a system that can simplify a purchase transaction. In the self-registration system, a customer launches a self-registration program on a hand-held computing device and registers data of commodities to be purchased through the computing device. As the data registered are transmitted to a point-of-sale (POS) terminal, a process required to complete the transaction at the POS terminal can be simplified.

In the related art, an electronic receipt system is also known as a system that can digitalize contents of a purchase transaction. In the electronic receipt system, a customer launches an electronic receipt program on a computing device and sends a request for electronic receipts related to purchase transactions made by the customer.

Usually, for each of the above computer-based commerce systems, a customer needs a customer (user) ID to log into the system and an authentication process of the system is separately established. It would be desirable if a plurality of computer-based commerce systems can be used in a single purchase transaction in a more convenient manner.

BRIEF DESCRIPTION OF THE DRAWINGS

FIG. 3 is a block diagram of a POS apparatus in the commodity sales processing system.
FIG. 4 is a block diagram of a portable information terminal in the commodity sales processing system.

DETAILED DESCRIPTION

According to an embodiment, a method for processing a purchase transaction of a customer at a store using a plurality of transaction systems connected over a network, the transaction systems including a store server, a user computing device in which the customer has installed a self-registration program, and an electronic receipt server, includes the steps of: launching the self-registration program in the user computing device; capturing with the user computing device, an image of a product code identifier placed on a product to be purchased; generating a transaction file with respect to a transaction to be made by a customer at the store, the transaction file containing a product code of the product to be purchased, the product code being transmitted from the user computing device when the user computer device captures the image of the product code identifier placed on the product, a first user ID of the customer that was created for the customer when the customer installed the self-registration program on the user computing device, and an indicator of whether or not the customer has opted in to receive electronic receipts; generating an electronic receipt for the transaction based on the transaction file; storing a conversion table containing the first user ID for the self-registration, in association with a second user ID of the customer that was created for the customer when the customer opted in to receive electronic receipts; converting the first user ID contained in the transaction file to the second user ID based on the conversion table, when the indicator indicates that the customer has opted in to receive electronic receipts; and storing in a storage device by the electronic receipt server, the electronic receipt in association with the second user ID converted from the first user ID. The electronic receipt server transmits the stored electronic receipt over the network in response to a request received over the network from a computing device associated with the second user ID.

Embodiments of a commodity sales processing system in which a self-registration system is associated with an electronic receipt system, are described below with reference to the accompanying drawings.

First Embodiment

[Commodity Sales Processing System]

Figure 1:
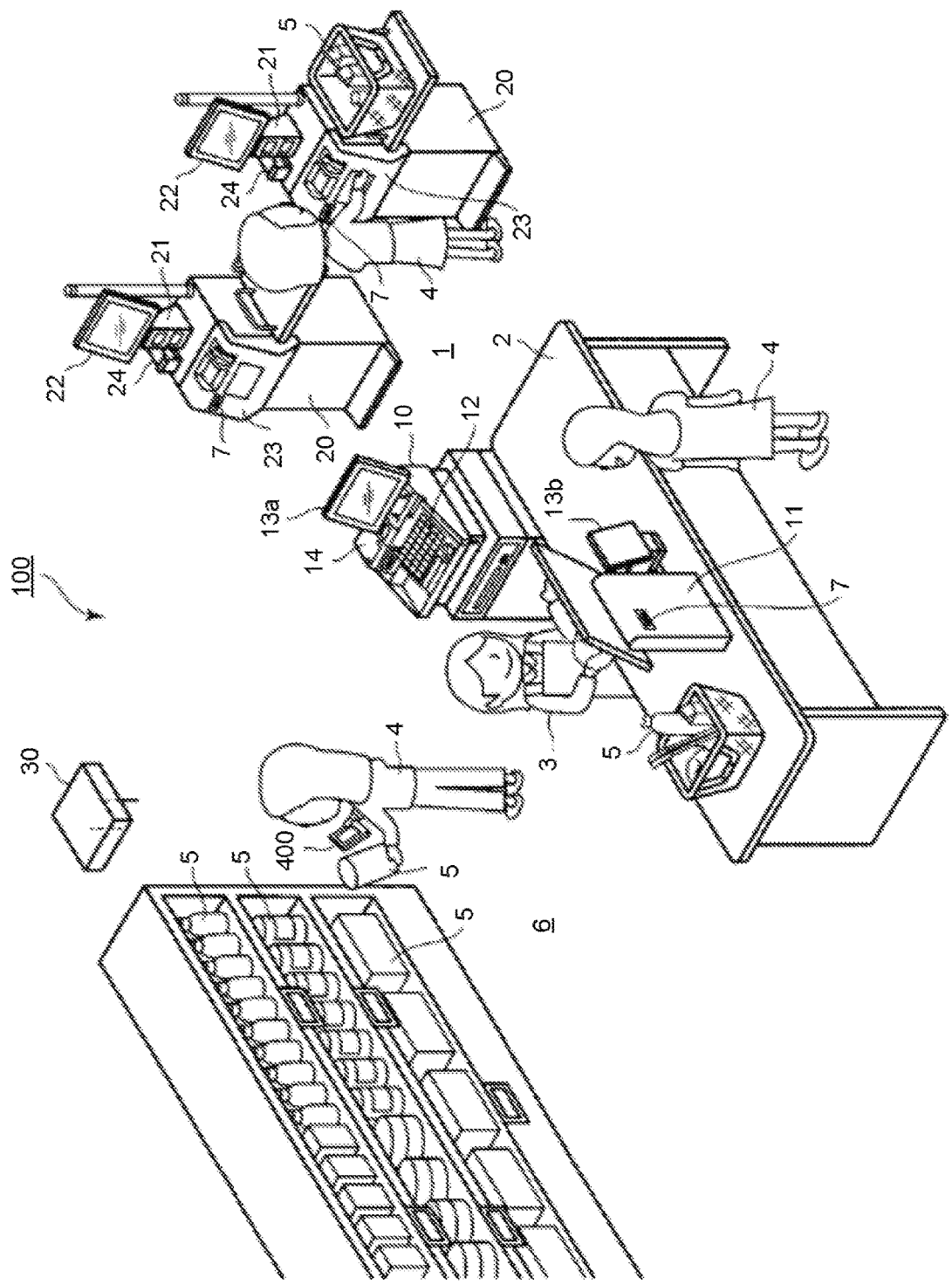
FIG. 1 schematically illustrates a retail store having a commodity sales processing system according to a first embodiment.
Figure 2:
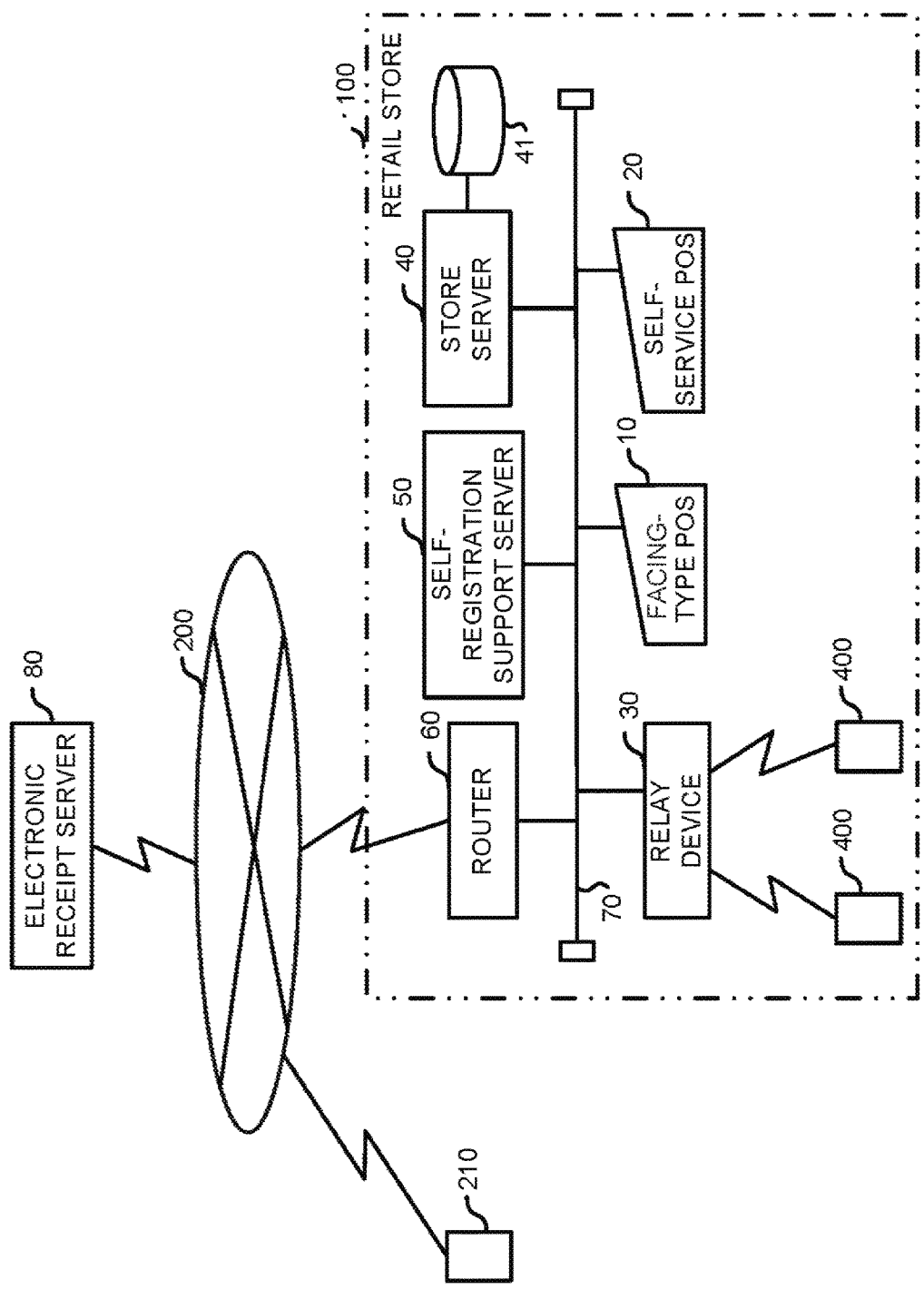
FIG. 2 is a block diagram of the commodity sales processing system.

FIG. 1 schematically illustrates a retail store 100 having a commodity sales processing system, and FIG. 2 is a block diagram of the commodity sales processing system.

As shown in FIG. 1 and FIG. 2, the commodity sales processing system includes a facing-type POS (Point Of Sales) apparatus 10, a self-service POS apparatus 20, and a relay device 30 in the retail store 100. Further, as shown in FIG. 2, the commodity sales processing system includes a store server 40, a self-registration support server (hereinafter referred to as a support server) 50, and a router 60 in the retail store 100. Moreover, in the retail store 100, the commodity sales processing system includes a LAN (Local Area Network) 70 with which the POS apparatuses 10 and 20, the relay device 30, the store server 40, the support server 50, and the router 60 are connected. The LAN 70 may be a wired LAN or a wireless LAN. The router 60 relays data communication between the LAN 70 and a network 200.

In the commodity sales processing system, POS apparatuses 10, 20, and the support server 50 function as a commodity sales processing apparatus. The support server 50 includes a registration unit having a commodity detector configured to detect commodity codes input by customers, and the POS apparatuses 10, 20 function as a settlement unit having an input device for inputting sales data.

The electronic receipt server 80 is connected with the network 200. The electronic receipt server 80 also stores electronic receipt data, i.e., electronic receipts. By accessing the electronic receipt server 80 from an information processing apparatus 210 connected with the network 200, a customer can browse his or her electronic receipts on the information processing apparatus 210. The information processing apparatus 210 may be a personal computer, a smart phone, a mobile phone, a tablet terminal, or the like. The network 200 is, for example, the Internet or a mobile communication network.

Although only the commodity sales processing system of one store is shown in FIG. 2, the commodity sales processing systems of a plurality of retail stores 100 may be connected with the network 200. Moreover, the commodity sales processing systems of the retail stores 100 may share the electronic receipt server 80.

[POS Apparatus (Commodity Sales Data Processing Apparatus)]

As shown in FIG. 1, the facing-type POS apparatus 10 located at a checkout counter 2 in a checkout region 1 is operated by a cashier 3. The POS apparatus 10 includes a scanner 11 located on the checkout counter 2. The scanner 11 is also operated by the cashier 3. The cashier faces a customer 4 waiting to check out across the checkout counter 2. The cashier 3 reads, with the scanner 11, a barcode affixed on a commodity 5 to be purchased by the customer 4. The scanner 11 sends barcode data obtained by reading the barcode to the POS apparatus 10. The POS apparatus 10 specifies the commodity 5 according to the barcode data sent from the scanner 11 and registers sales quantities, the sales amount and the like of the commodity 5, in a transaction region in memory. Further, the POS apparatus 10 displays the commodity name, the sales quantities, the sales amount and total amount of the commodities 5 registered in the transaction region, on a display 13. The display 13 includes a display 13a for operator and a display 13b for customer.

If the commodities 5 purchased by the customer 4 are all registered, then the cashier 3 inputs payment data through the input device of the POS apparatus 10. For example, the cashier 3 operates a keyboard 12 to input an amount paid by the customer. The POS apparatus 10 executes a settlement process on the commodity transaction with the customer 4 according to the payment data. During the settlement process, the POS apparatus 10 drives a printer 14 to issue a receipt (hereinafter referred to as a paper receipt) by printing the details of the commodity transaction on receipt paper. If the customer 4 is an electronic receipt member (subscriber), then the issuing of the paper receipt may be optional.

The self-service POS apparatus 20 is located at the checkout region 1 for the customer 4 to operate. The POS apparatus 20 has a scanner 21, a touch panel 22, an automatic change dispensing machine 23, and a printer 24 for printing a receipt. The customer 4 standing in front of the POS apparatus 20 operates the scanner 21 to read the barcode affixed on a commodity 5 to be purchased by the customer 4. The POS apparatus 20 specifies the commodity 5 according to the barcode read by the scanner 21 and registers the sales quantities, the sales amount, and the like of the commodity 5 in a transaction region. Further, the POS apparatus 20 displays the commodity name, the sales quantities, the sales amount, and the total amount of commodities 5 registered in the transaction region, on the touch panel 22.

After the registration processing of the sales commodities 5 is completed, the customer 4 inputs payment data through the input device of the POS apparatus 20. For example, the customer 4 operates the touch panel 22 to select a payment method. If a cash payment is selected, the customer 4 puts cash into the automatic change dispensing machine 23. If an electronic money payment is selected, the customer 4 directs an electronic money card to a reader/writer (not shown). The POS apparatus 20 carries out a settlement process for the commodities transaction for the customer 4 according to the payment data. During the settlement process, the POS apparatus 20 drives the printer 24 to issue a paper receipt on which the content of the commodity transaction is printed. If the customer 4 is an electronic receipt member (subscriber), then the issuing of the paper receipt may be optional.

Instead of or in addition to the foregoing payment methods, other payment methods such as credit card payment and merchandise coupon payment may be included in the payment methods available in the POS apparatus 20. Instead or in addition to cash payment, other payment methods such as electronic money payment, credit card payment, or merchandise coupon payment can also be included in the payment methods available in the POS apparatus 10.

The POS apparatus 10 or 20 is referred to as a commodity sales data processing apparatus.

FIG. 3 is a block diagram of the POS apparatus 10 or 20. The POS apparatus 10 or 20 includes a processor 101, a main memory 102, an auxiliary storage device 103, a communication interface 104 and an I/O (Input/Output) interface 105. The processor 101 is connected with the main memory 102, the auxiliary storage device 103, the communication interface 104 and the I/O interface 105 via a system transmission line 106 including an address bus line, a data bus line, a control signal line and the like.

The POS apparatus 10 or 20 comprises a computer including the processor 101, the main memory 102, the auxiliary storage device 103, and the system transmission line 106 connecting these sections.

The processor 101 acts as a central component of the computer. The processor 101 controls each section to perform the various functions of the POS apparatus 10 or 20 according to an operating system or application program.

The main memory 102 acts as main memory of the computer. The main memory 102 includes a nonvolatile memory unit and a volatile memory unit. The main memory 102 stores an operating system or application program in the nonvolatile memory unit. Further, in some cases, the main memory 102 also stores data required by the processor 101 to control each component in the nonvolatile or volatile memory unit. The main memory 102 uses the volatile memory unit as a work area for the processor 101 to rewrite data properly. The work area includes a transaction region. The transaction region is a region in which the sales data of the commodities sold in a commodity transaction and the settlement data of the commodity transaction are stored.

The auxiliary storage device 103 acts as auxiliary memory of the computer. The auxiliary storage device 103 may be, for example, an EEPROM (Electric Erasable Programmable Read-Only Memory), a HDD (hard disk drive) or an SSD (solid state drive). The auxiliary storage device 103 persistently stores the data used by the processor 101 to carry out various processes or the data generated in the process carried out by the processor 101. The auxiliary storage device 103 may also store the foregoing operating system and application program.

The communication interface 104 is an interface for carrying out data communication between the store server 40 and the support server 50 which are connected with each other via the LAN 70.

The I/O interface 105 is an interface for data communication among various input/output devices. In the case of facing-type POS apparatuses 10, the scanner 11, the keyboard 12, the display for operator 13a, the display for customer 13b, and the printer 14 are connected with the I/O interface 105. In the case of the self-service POS apparatus 20, the scanner 21, the touch panel 22, the automatic change dispensing machine 23, and the printer 24 are connected with the I/O interface 105.

No specific limitations are given to the number of the facing-type POS apparatuses 10 or the self-service POS apparatuses 20 installed in a retail store 100. A proper number of facing-type POS apparatuses 10 and a proper number of self-service POS apparatuses 20 are installed in the retail store 100 according to the scale or the layout inside the retail store 100. Further, it is not necessary to include both of the facing-type POS apparatuses 10 and the self-service POS apparatuses 20. Instead, only one of the facing-type POS apparatus 10 and the self-service POS apparatus 20 may be installed at the checkout region 1 for the commodity sales processing system.

The POS ID of each of the POS apparatuses 10 and 20 is stored in the auxiliary storage device 103. The POS ID of each of the POS apparatuses 10 and 20 may also be stored in the main memory 102. The POS ID is the fixed identification information of each of the POS apparatuses 10 and 20. The POS ID of each of the POS apparatuses 10 and 20 is also unique. The store server 40 and the support server 50 identify each of the POS apparatuses 10 and 20 connected with the LAN 70 according to the POS ID of the POS apparatus 10 or 20.

Each of the POS apparatuses 10 and 20 is marked with a barcode 7 representing the POS ID thereof. For example, as shown in FIG. 1, in the case of the facing-type POS apparatuses 10, a barcode 7 is marked on a surface of the scanner 11 opposite to the side where the cashier 3 operates the scanner 11, that is, on the side of the customer 4. In the case of the self-service POS apparatus 20, the barcode 7 is marked on the front side of the housing of the self-service POS apparatus 20 opposite to the customer 4. Further, the position of the barcode 7 shown in FIG. 1 is only an example. No specific limitations are given to the position of the barcode 7. In addition, the barcode 7 may be replaced by a two-dimensional code.

[Store Server]

As shown in FIG. 2, the store server 40 includes a commodity database 41. In the commodity database 41, the commodity data, for example, the commodity name and the price, of each commodity sold in the retail store 100 is stored in association with the commodity code thereof. The commodity code is unique to each commodity 5. Each commodity 5 has a barcode of the commodity displayed thereon. By reading the barcode using the scanner 11 or 21, the POS apparatus 10 or 20 registers the sales data of the commodity 5 in the transaction region.

The store server 40 collects, via the LAN 70, the sales data of each commodity 5 registered by each of POS apparatuses 10 and 20. Then, the store server 40 sorts the collected sales data by commodity, by time range and the like. That is, the POS apparatus 10 or 20 and the store server 40 function as a well-known POS system.

[Relay Device]

The relay device 30 conforms to, for example, a wireless communication standard such as Wi-Fi (Wireless Fidelity). One or more of the relay devices 30 are located in the retail store so that the wireless communication region of the relay devices 30 substantially covers the entire region of a sales floor 6 and the checkout region 1 in the retail store 100. The relay device 30 sends or receives data through wireless communication, using one or more portable information terminals 400 existing in the wireless communication region. No specific limitations are given to the number of the relay devices 30. A proper number of relay devices 30 may be installed in the retail store 100 according to the scale or the internal layout of the retail store 100.

[Portable Information Terminal]

FIG. 4 is a block diagram of the portable information terminal 400. The portable information terminal 400 includes a processor 401, a main memory 402, an auxiliary storage device 403, a touch panel 404, a camera unit 405, and a wireless unit 406. The processor 401 is connected with the main memory 402, the auxiliary storage device 403, the touch panel 404, the camera unit 405, and the wireless unit 406 via a system transmission line 407 including an address bus line, a data bus line, a control signal line, and the like.

The portable information terminal 400 comprises a computer including the processor 401, the main memory 402, the auxiliary storage device 403 and the system transmission line 407 connecting these sections.

The processor 401 acts as a main component of the computer. The processor 401 controls each section to perform the functions of the portable information terminal 400 according to an operating system or application program.

The main memory 402 acts as main memory of the computer. The main memory 402 includes a nonvolatile memory unit and a volatile memory unit. The main memory 402 stores an operating system or application program in the nonvolatile memory unit. Further, the main memory 402 also stores the data required by the processor 401 to control each section in the nonvolatile or volatile memory unit. The main memory 402 uses the volatile memory unit as a work area for the processor 401 to rewrite data properly.

The auxiliary storage device 403 acts as auxiliary memory of the computer. The auxiliary storage device 403 is, for example, an EEPROM. A HDD and an SSD may also be used as the auxiliary storage device 403. The auxiliary storage device 403 persistently stores the data used by the processor 401 to carry out various processes or the data generated in the process carried out by the processor 401. The auxiliary storage device 403 may also store the foregoing operating system and application program.

The touch panel 404 functions as the input device and a display device of the portable information terminal 400. An icon for starting the foregoing application program may be displayed on the touch panel 404.

The camera unit 405 has a resolution that is sufficient to recognize a barcode. The wireless unit 406 sends data to or receives data from the relay device 30 through wireless communication. For example, among portable information processing apparatuses such as smart phones, mobile phones and tablet terminals, an information processing apparatus having the camera unit 405 and the wireless unit 406 functions as the portable information terminal 400.

By executing a self-registration terminal program P1, the portable information terminal 400 with such a structure functions as an information terminal corresponding to a self-registration system. The self-registration system can perform the registration process in place of the POS apparatus 10 or 20 by enabling the customer 4 to register data of a sales commodity through the information terminal. The settlement process of the commodity purchase is executed by the POS apparatus 10 or 20 in the conventional manner.

When the processor executes the self-registration terminal program P1, the portable information terminal 400 functions as an information terminal corresponding to the self-registration system. The self-registration terminal program P1 is stored in the auxiliary storage device 403. Further, a self-registration management region W1 is formed in the auxiliary storage device 403 of the portable information terminal 400.

By executing an electronic receipt terminal program P2, the portable information terminal 400 functions as an information terminal corresponding to an electronic receipt system. The electronic receipt system is a system which formats the information of a receipt (receipt data) generated by each of the POS apparatuses 10 and 20, stores the electronic receipt data in the electronic receipt server 80, such that the receipt data can be retrieved by the information processing apparatus 210 via the network 200. That is, the portable terminal containing the electronic receipt terminal program P2 functions as the information processing apparatus 210.

When the processor 401 executes the electronic receipt terminal program P2, the portable information terminal 400 functions as an information terminal corresponding to the electronic receipt system. The electronic receipt terminal program P2 is stored in the auxiliary storage device 403. Further, an electronic receipt management region W2 is formed in the auxiliary storage device 403 of the portable information terminal 400.

[Support Server (Commodity Data Input Support Server)]

Figure 5:
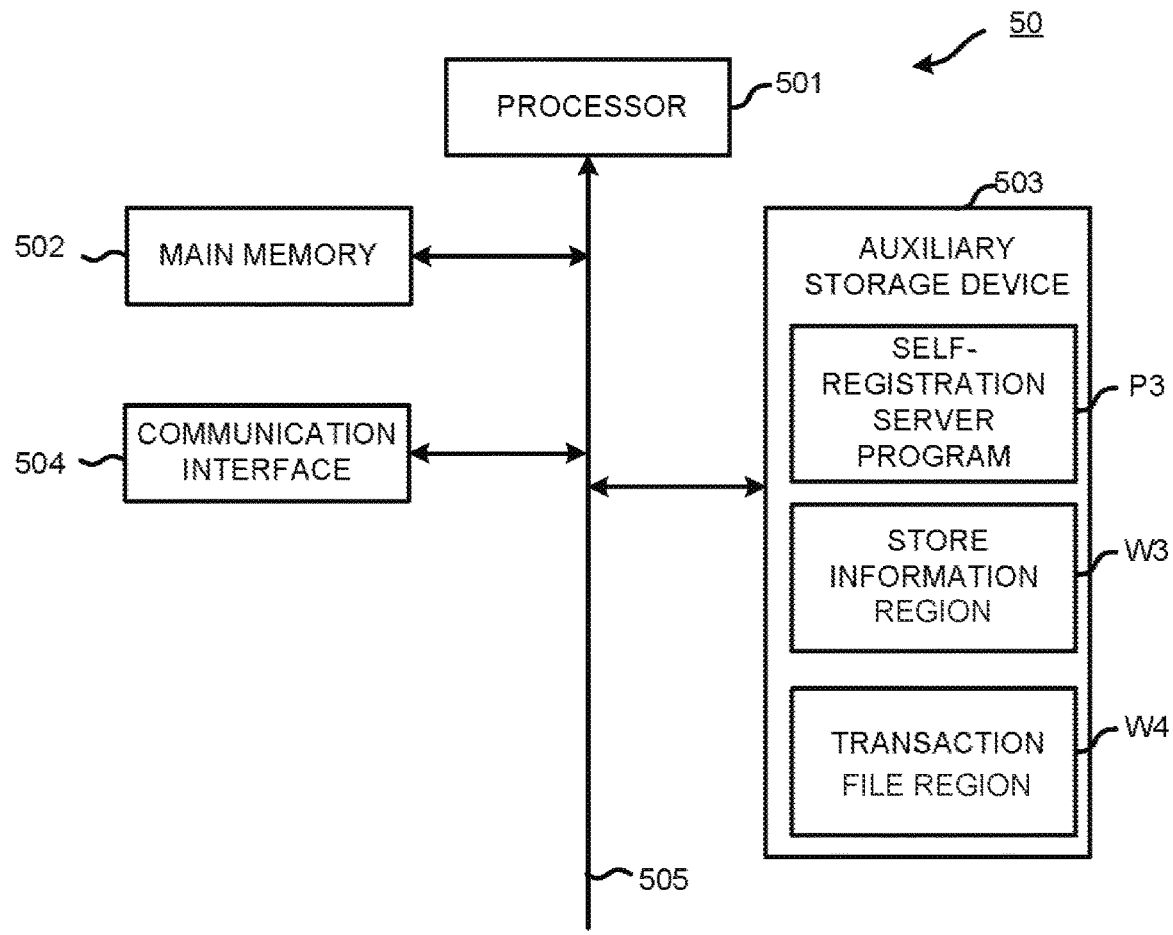
FIG. 5 is a block diagram of a support server in the commodity sales processing system.

FIG. 5 is a block diagram of the support server 50. The support server 50 includes a processor 501, a main memory 502, an auxiliary storage device 503, and a communication interface 504. The processor 501 is connected with the main memory 502, the auxiliary storage device 503, and the communication interface 504 via a system transmission line 505 including an address bus line, a data bus line, a control signal line, and the like.

The support server 50 comprises a computer having the processor 501, the main memory 502, the auxiliary storage device 503, and the system transmission line 505 connecting these sections.

The processor 501 acts as a main component of the computer. The processor 501 controls each section to perform the functions of the support server 50 according to an operating system or application program.

The main memory 502 acts as main memory of the computer. The main memory 502 includes a nonvolatile memory unit and a volatile memory unit. The main memory 502 stores an operating system or application program in the nonvolatile memory unit. Further, the main memory 502 may also store the data needed by the processor 501 to control each section in the nonvolatile or volatile memory unit. The main memory 502 uses the volatile memory unit as a work area for the processor 501 to rewrite data properly.

The auxiliary storage device 503 acts as auxiliary memory of the computer. The auxiliary storage device 503 is, for example, an EEPROM, a HDD, or an SSD. The auxiliary storage device 503 persistently stores the data used by the processor 501 to carry out various processes or the data generated by the process carried out by the processor 501. The auxiliary storage device 503 may also store the foregoing operating system and application program.

The communication interface 504 is an interface for data communication between the store server 40 and each of POS apparatuses 10 and 20 which are connected with each other via the LAN 70.

The support server 50 having the foregoing structure functions as a commodity data input support server that supports a user input of commodity data related to a self-registration process, and has a self-registration server program P3 in the auxiliary storage device 503. Further, the support server 50 forms a store information region W3 and a transaction file region W4 in the auxiliary storage device 503.

The self-registration server program P3 stays in the support server 50. Through the support server 50 executing the self-registration server program P3 in cooperation with the portable information terminal 400 executing the self-registration terminal program P1, the customer 4 can carry out a self-registration process for commodities to be purchased.

The store information region W3 is a region for storing information relating to the retail store (seller) 100, in which the support server 50 is arranged, for example, seller information such as the name of a store.

Figure 6:
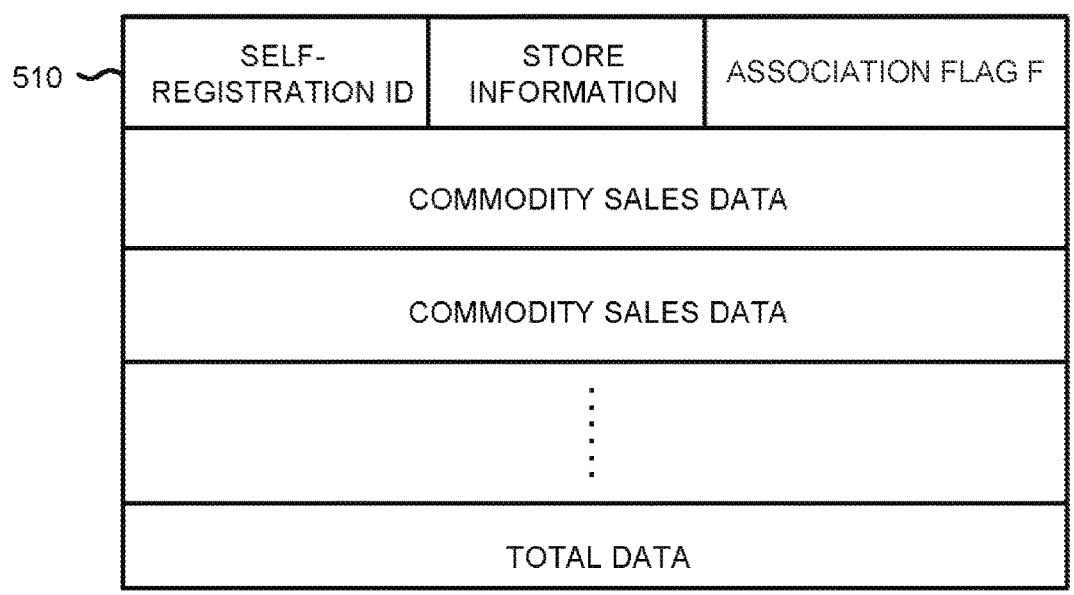
FIG. 6 schematically illustrates a data structure of a commodity transaction file.

The transaction file region W4 is a region for storing a commodity transaction file 510 having a data structure shown in FIG. 6. The commodity transaction file 510 is formed for each customer 4 executing a self-registration process. A plurality of commodity transaction files 510 corresponding to a plurality of customers 4 can be synchronously stored in the transaction file region W4.

The data in the commodity transaction file 510 consists of a self-registration ID, store information, an association flag F, one or more commodity sales data, and a total sales data.

The self-registration ID (first ID) is a unique code for identifying a customer 4 who performs a self-registration operation. That is, the self-registration ID (first ID) is an ID of the user of the portable information terminal 400. A self-registration ID is set for each customer 4 when each customer 4 installs the self-registration terminal program P1 in the portable information terminal 400. The self-registration ID is used as an authentication ID for a customer 4 to log into the support server 50 from the portable information terminal 400. If the customer 4 logs into the support server 50, then the self-registration ID is stored in the self-registration management region W1 of the portable information terminal 400. Each customer 4 is assigned an optional but unique self-registration ID.

The association flag F is 1-bit data indicating whether or not the self-registration system is associated with the electronic receipt system. A customer 4 who installs the self-registration terminal program P1 and the electronic receipt terminal program P2 in the portable information terminal 400 can make the self-registration system become associated with the electronic receipt system. That is, the customer 4 can download details of the transaction for the commodities self-registered to the portable information terminal 400 as an electronic receipt and browse the details of the commodity transaction. Whether or not the self-registration system is associated with the electronic receipt system can be optionally set by the customer 4. If the association of the self-registration system with the electronic receipt system is set by the customer 4, then an association flag F is set in the self-registration management region W1 of the portable information terminal 400. If the association is not set, then the association flag F is not set therein. The customer 4 can change the setting of the association flag F by operating the portable information terminal 400.

Further, the support server 50 can use, for example, a conventional server device or a conventional computing device as the basic hardware thereof. The support server 50 may not initially contain the self-registration server program P3 in the auxiliary storage device 503 thereof, and the self-registration server program P3 may be installed later. In this case, the self-registration server program P3 is delivered by being recorded in a removable recording medium such as a magnetic disc, a magneto-optical disc, a compact disc, or a semiconductor memory, or by being downloaded through a network. Moreover, in this case, the self-registration server program P3 is written into the auxiliary storage device 503 through an operation of the user.

[Electronic Receipt Server]

Figure 7:
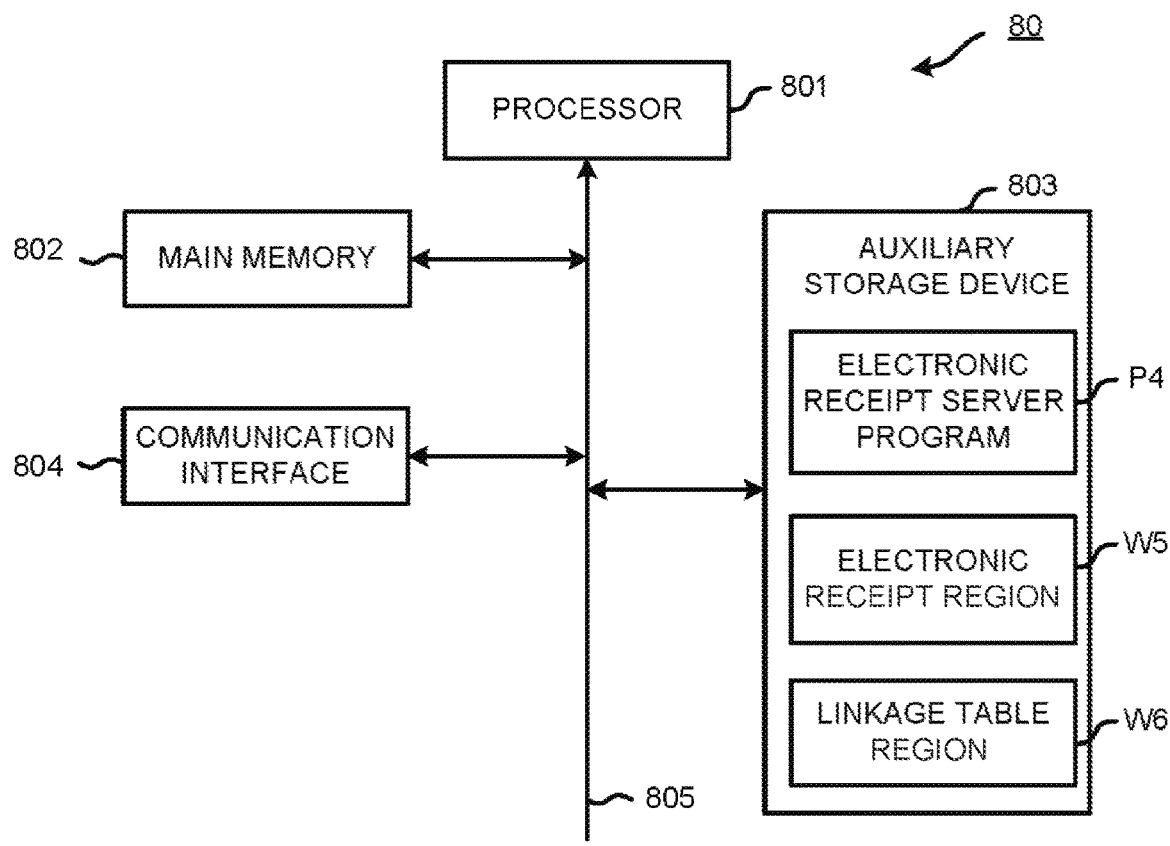
FIG. 7 is a block diagram of an electronic receipt server in the commodity sales processing system.

FIG. 7 is a block diagram of the electronic receipt server 80. The electronic receipt server 80 includes a processor 801, a main memory 802, an auxiliary storage device 803 and a communication interface 804. The processor 801 is connected with the main memory 802, the auxiliary storage device 803, and the communication interface 804 via a system transmission line 805 including an address bus line, a data bus line, a control signal line, and the like.

The electronic receipt server 80 comprises a computer having the processor 801, the main memory 802, the auxiliary storage device 803, and a system transmission line 805 connecting these sections.

The processor 801 acts as a main component of the computer. The processor 801 controls each section to perform the functions of the electronic receipt server 80 according to an operating system or application program.

The main memory 802 acts as main memory of the computer. The main memory 802 includes a nonvolatile memory unit and a volatile memory unit. The main memory 802 stores an operating system or application program in the nonvolatile memory unit. Further, the main memory 802 may also store the data required by the processor 801 to control each component in the nonvolatile or volatile memory unit. The main memory 802 uses the volatile memory unit as a work area for the processor 801 to rewrite data properly.

The auxiliary storage device 803 acts as auxiliary memory of the computer. The auxiliary storage device 803 is, for example, an EEPROM, an HDD, or an SSD. The auxiliary storage device 803 persistently stores the data used by the processor 801 to carry out various processes or the data resulting from the process carried out by the processor 801. The auxiliary storage device 803 may store also the foregoing operating system and application program.

The communication interface 804 is an interface for the data communication between the store server 40 and the information processing apparatus 210 which are connected with each other via the network 200.

The electronic receipt server 80 having this structure contains an electronic receipt server program P4 in the auxiliary storage device 803. Further, the electronic receipt server 80 has an electronic receipt region W5 and a linkage table region W6 in the auxiliary storage device 803.

The electronic receipt server program P4 is stored in the electronic receipt server 80. Through execution of the electronic receipt server program P4 by the electronic receipt server 80 and the electronic receipt terminal program P2, the portable information terminal 400 can display an electronic receipt thereon.

Figure 8:
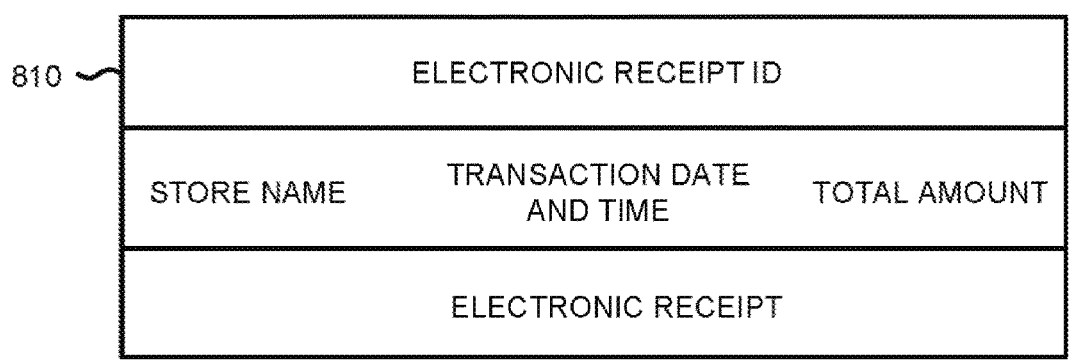
FIG. 8 schematically illustrates a data structure of an electronic receipt file.

The electronic receipt region W5 is a region for storing an electronic receipt file 810 having a data structure shown in FIG. 8. The electronic receipt file 810 is formed for each commodity transaction for which an electronic receipt is generated. A plurality of electronic receipt files 810 corresponding to a plurality of commodity transactions can be simultaneously stored in the electronic receipt region W5.

The data in the electronic receipt file 810 consists of an electronic receipt ID, a store name, a transaction date and time and a total amount, which represent simplified data of an electronic receipt, and the actual data of the electronic receipt. Further, the simplified data are not limited to the combination of a store name, a transaction date and time, and a total amount. For example, the simplified data may be a combination of a store name and a transaction date and time, or the combination of a transaction date and time, and a total amount. Further, other items different from a store name, a transaction date and time, and a total amount may also be contained in the simplified data.

The electronic receipt ID (second ID) is a unique code for identifying a customer 4 using the electronic receipt system. To use the electronic receipt system, a customer 4 carries out a member registration operation with respect to a system manager in advance. The customer 4 who completed the member registration receives a fixed electronic receipt ID assigned by the system manager. The electronic receipt ID is used as an authentication ID for the customer 4 to log into the electronic receipt server 80 from the portable information terminal 400. If the customer 4 logs into the electronic receipt server 80 from the portable information terminal 400, an electronic receipt ID is stored in the electronic receipt management region W2 of the portable information terminal 400. Each customer 4 who completed the member registration receives a unique electronic receipt ID. That is, the electronic receipt ID (second ID) is an ID used by the customer to receive an electronic receipt.

Figure 9:
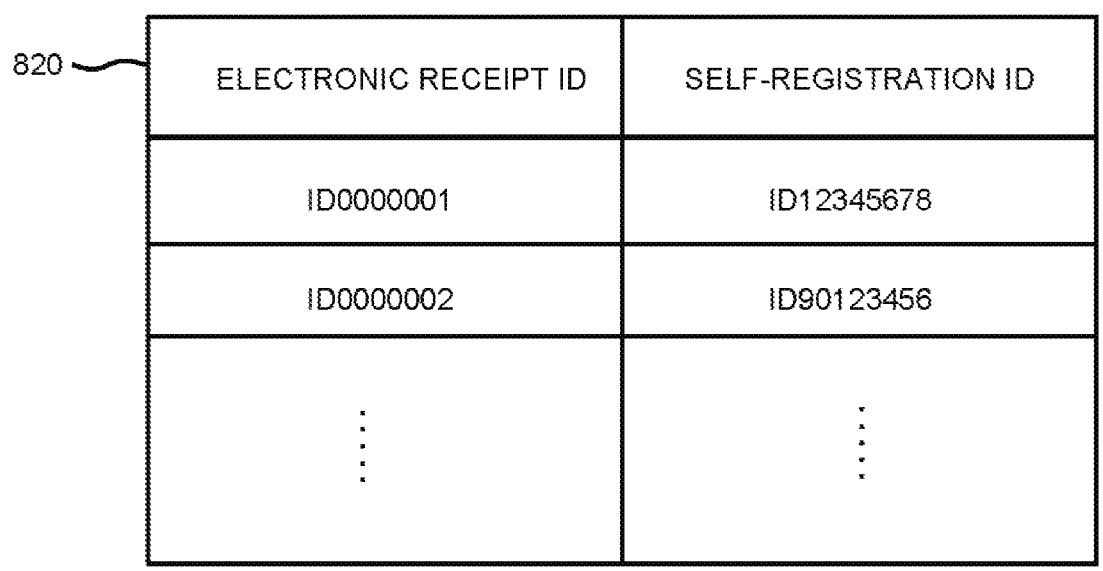
FIG. 9 schematically illustrates a data structure of a linkage table.

The linkage table region W6 is a region for storing a linkage table 820 having a data structure shown in FIG. 9. The linkage table 820 stores the electronic receipt ID of a customer 4 who sets the association of the self-registration system with the electronic receipt system in association with a self-registration ID. That is, when the customer 4 sets the association of the self-registration system with the electronic receipt system, the electronic receipt ID of the customer 4 is stored in the linkage table 820 in association with a self-registration ID.

Here, the electronic receipt server 80 can be set up using, for example, a conventional server device or computer device as the basic hardware thereof. The electronic receipt server 80 may not initially contain the electronic receipt server program P4 in the auxiliary storage device 803 thereof, and the electronic receipt server program P4 may be installed later. In this case, the electronic receipt server program P4 is recorded in a removable recording medium such as a magnetic disc, a magneto-optical disc, a compact disc, or a semiconductor memory, or by being downloaded through a network. Moreover, in this case, the electronic receipt server program P4 is written into the auxiliary storage device 803 through an operation of the user.

[Operation of Commodity Sales Processing System]

Figure 10:
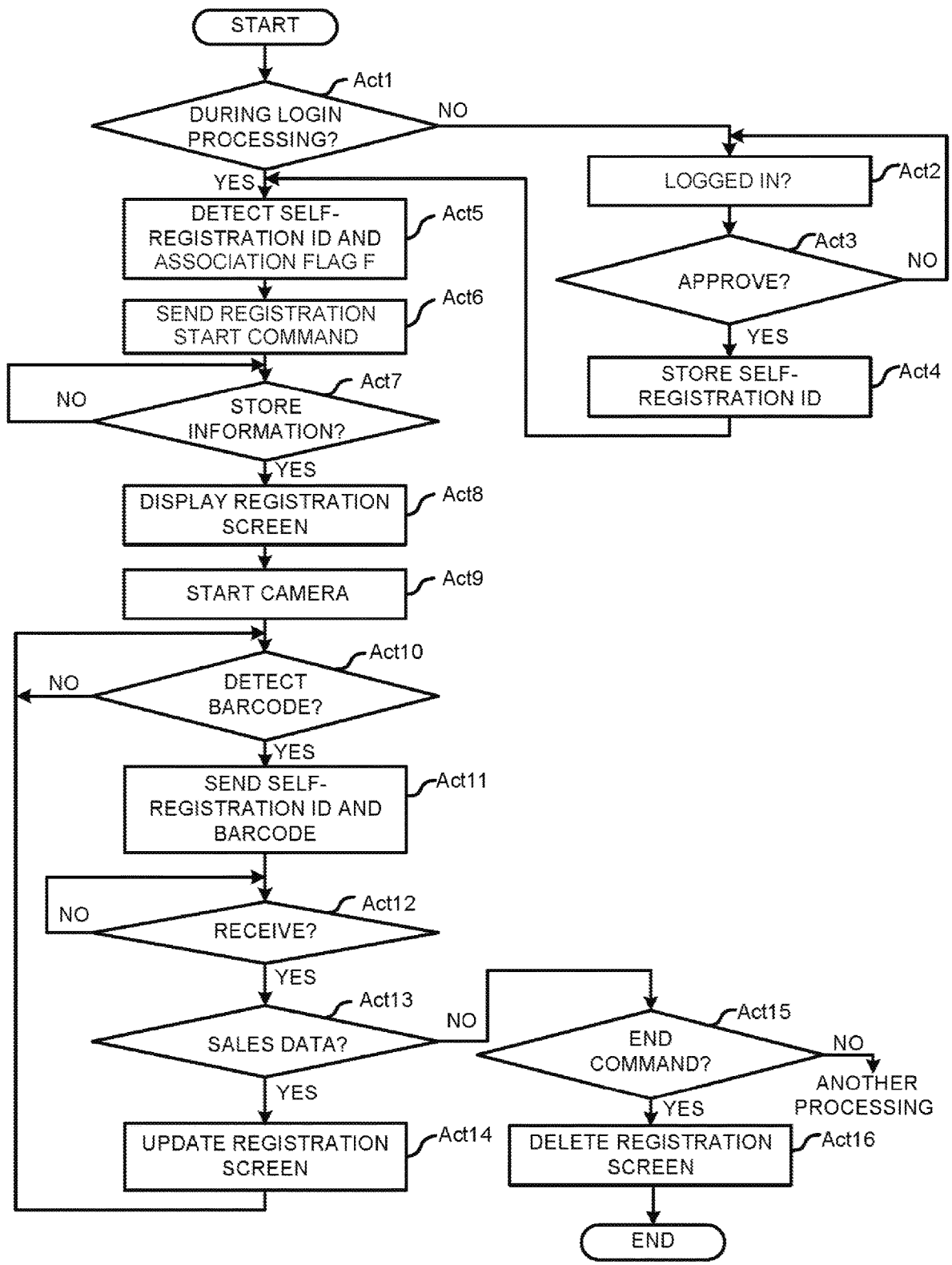
FIG. 10 is a flowchart illustrating a main procedure of a processing carried out by a processor of the portable information terminal according to a self-registration terminal program.
Figure 11:
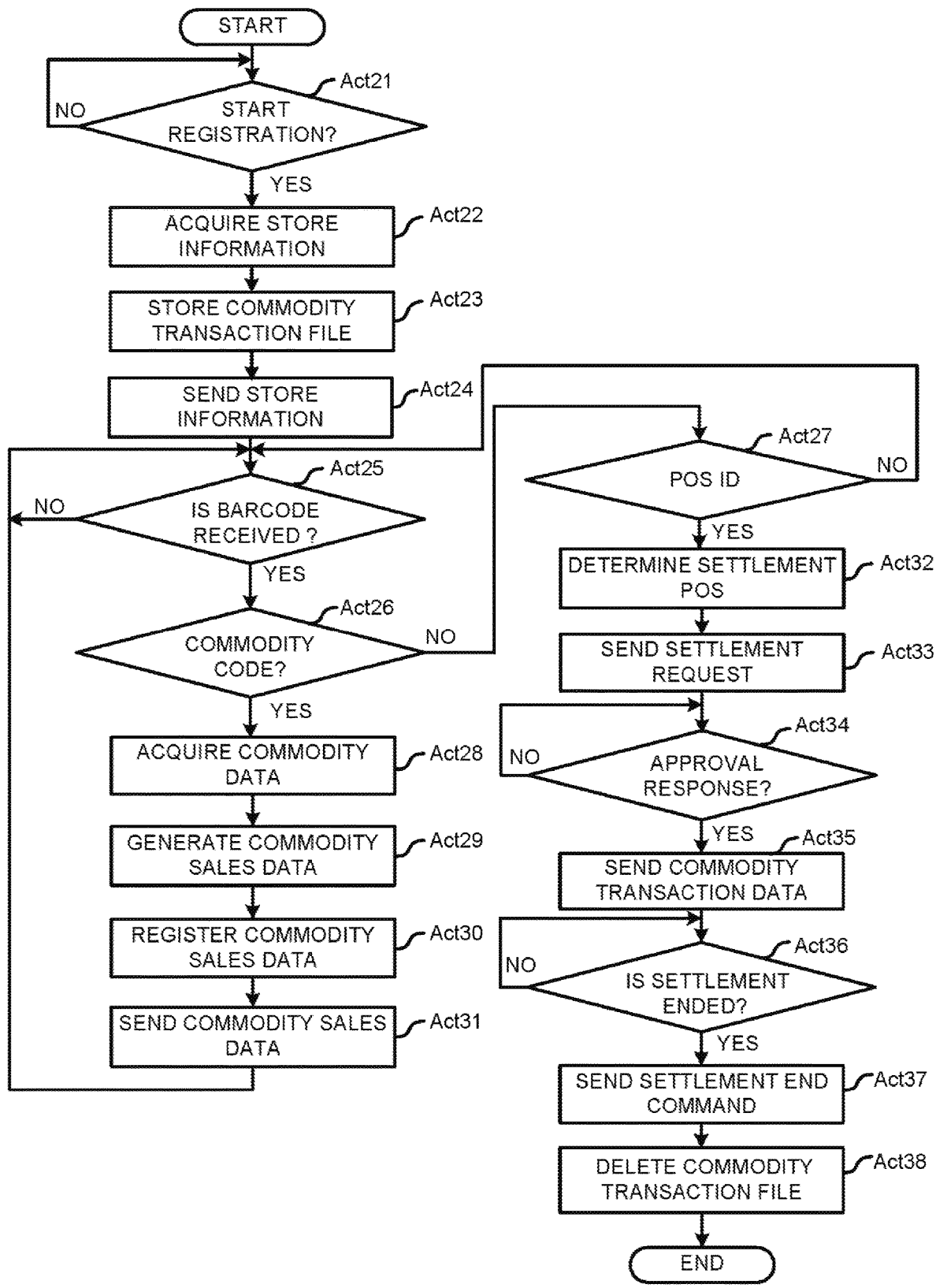
FIG. 11 is a flowchart illustrating a main procedure of a process carried out by a processor of the support server according to a self-registration terminal program.
Figure 12:
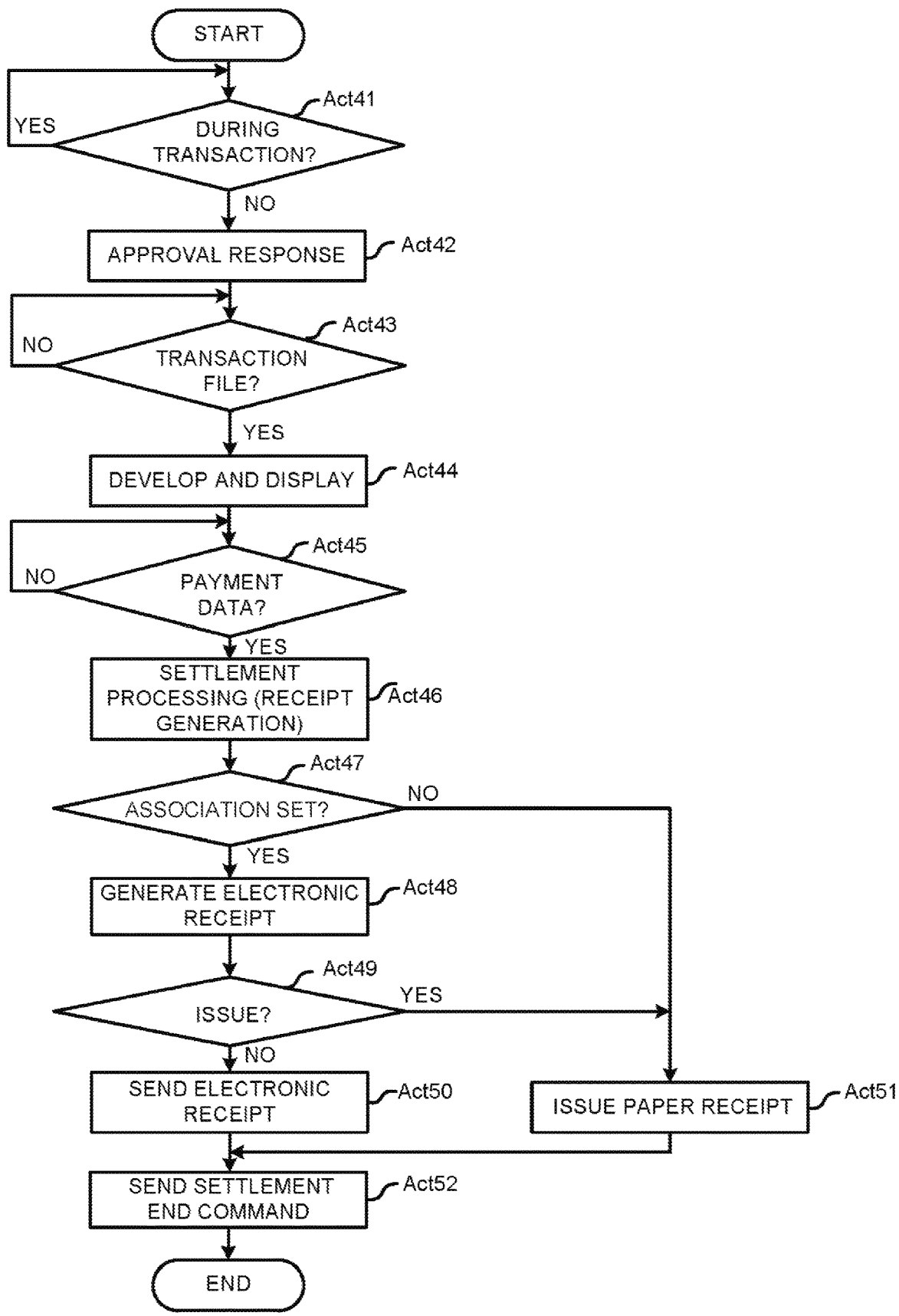
FIG. 12 is a flowchart illustrating a main procedure of a process carried out by a processor of the POS apparatus according to a control program when the POS apparatus receives a settlement request.
Figure 13:
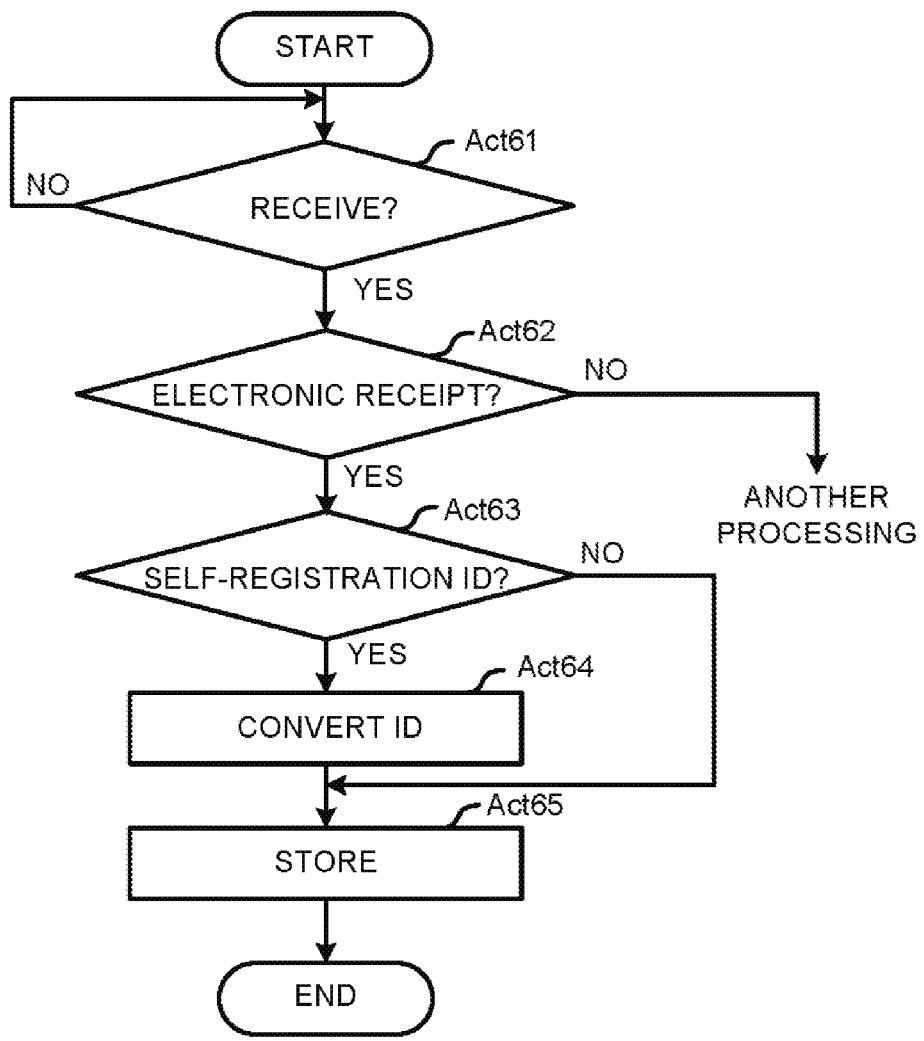
FIG. 13 is a flowchart illustrating a main procedure of a process carried out by a processor of the electronic receipt server according to an electronic receipt server program.

Next, an operation carried out by the commodity sales processing system when the self-registration system is associated with the electronic receipt system is described below with reference to flowcharts of FIG. 10-FIG. 13. FIG. 10 is a flowchart illustrating a main procedure of a process carried out by the processor 401 of the portable information terminal 400 according to the self-registration terminal program P1. FIG. 11 is a flowchart illustrating main operation of a process carried out by the processor 501 of the support server 50 according to the self-registration server program P3. FIG. 12 is a flowchart illustrating a main procedure of a process carried out by the processor 101 of the POS apparatus 10 or 20 according to a control program when the POS apparatus receives a settlement request (described below). FIG. 13 is a flowchart illustrating main procedures of a process carried out by the processor 801 of an electronic receipt server 80 according to the electronic receipt server program P4. Here, the content of each processing described below with reference to FIG. 10-FIG. 13 is merely an example, and various other processes that can achieve the same structure can be properly performed.

Before shopping in the retail store 100, the customer 4 operates the touch panel 404 of the portable information terminal 400 to start the self-registration terminal program P1. That is, the customer 4 touches the icon to launch the self-registration terminal program P1, displayed on the touch panel 404. If the self-registration terminal program P1 is started, then the processor 401 of the portable information terminal 400 starts the process shown in FIG. 10.

First, the processor 401 determines whether or not the customer has logged into the support server 50 (Act 1). If the self-registration terminal program P1, after being launched, is ended without being logged out, the login state of the customer is maintained. A self-registration ID serving as an authentication ID is stored in the self-registration management region W1 during the login state.

If the customer has not logged into the support server (No in Act 1), the processor 401 displays a login screen on the touch panel 404 (Act 2). A customer 4 logs in by inputting a self-registration ID on the login screen. The customer 4 may input a self-registration ID and a password.

When the customer logs in, the processor 401 wirelessly sends login information including the self-registration ID. The login information is received by the relay device 30 and transmitted therefrom to the support server 50 via the LAN 70. The support server 50 authenticates the login operation. Then, the support server 50 notifies the portable information terminal 400 of the result of the authentication through a route inverse to that for login information.

The processor 401 determines whether or not the login is approved (Act 3). If it is determined that the login is not approved (No in Act 3), the processor 401 may perform a login operation again (Act 2). If it is determined that the login is approved (Yes in Act 3), the processor 401 stores the self-registration ID used for the login operation in the self-registration management region W1 (Act 4).

If the login is approved and the self-registration ID is stored in the self-registration management region W1 or the self-registration ID is stored in the self-registration management region W1 during the login process (Yes in Act 1), the processor 401 extracts the self-registration ID from the self-registration management region W1. Further, the processor 401 extracts an association flag F in the self-registration management region W1 (Act 5). The association flag F is set as '1' if the user sets the association of the self-registration system with the electronic receipt system. The association flag F is set as '0' if the association of the self-registration system with the electronic receipt system is not set.

The processor 401 wirelessly sends a registration start command containing the self-registration ID and the association flag F extracted from the self-registration management region W1 (Act 6). The registration start command wirelessly sent from the wireless unit 406 is received by the relay device 30 and transmitted therefrom to the support server 50 via the LAN 70.

As shown in FIG. 11, the processor 501 of the support server 50 in which the self-registration server program P3 runs, waits for the registration start command (Act 21). If the processor 501 receives the registration start command sent from the portable information terminal 400, the processor 501 acquires store information from the store information region W3 of the auxiliary storage device 503 (Act 22). Moreover, the processor 501 generates a commodity transaction file 510 in the transaction file region W4. Then, the processor 501 stores the self-registration ID and the association flag F that are contained in the registration start command and the store information acquired from the store information region W3 in the commodity transaction file 510 (Act 23).

The processor 501 sends the store information to the portable information terminal 400 from where the registration start command is originally sent (Act 24). The store information is wirelessly sent from the relay device 30 and received by the wireless unit 406 of the portable information terminal 400 that has sent the registration start command. Further, not limited to the foregoing sequence, Act 22 and Act 23 may be executed in a reverse sequence. Further, not limited to the foregoing sequence, Act 23 and Act 24 may be executed in a reverse sequence.

As shown in FIG. 10, the processor 401 of the portable information terminal 400 which has sent the registration start command waits to receive the store information (Act 7). If the wireless unit 406 receives the store information (Yes in Act 7), the processor 401 displays a registration screen on the touch panel 404 (Act 8). Further, the processor 401 drives the camera unit 405 (Act 9). Here, not limited to the foregoing sequence, Act 8 and Act 9 may be executed in a reverse sequence.

The registration screen displays, for example, the store information. Detail columns, including columns of 'commodity name', 'price', and 'total amount' are displayed on the registration screen. Information for urging the customer 4 to carry out a self-registration operation may also be displayed on the registration screen. The customer 4 who viewed the registration screen starts shopping on the sales floor 6. Then, the customer 4 photographs the barcode affixed on a commodity 5 to be purchased, using the camera unit 405. The photographed commodity 5 is placed in a shopping cart.

The processor 401 of the portable information terminal 400 waits until a barcode is detected from an image captured by the camera unit 405 (Act 10). If the barcode is detected (Yes in Act 10), the processor 401 adds the self-registration ID stored in the self-registration management region W1 to the barcode data and wirelessly sends the processed barcode data (Act 11). The barcode data containing the self-registration ID sent from the wireless unit 406 is received by the relay device 30 and transmitted therefrom to the support server 50 via the LAN 70.

As shown in FIG. 11, the processor 501 of the support server 50 which has sent the store information to the portable information terminal 400 waits until the barcode data are sent from the portable information terminal 400 (Act 25). If the processor 501 receives the barcode data containing the self-registration ID (Yes in Act 25), the processor 501 determines whether the barcode data are a commodity code or a POS ID (Act 26 and Act 27). A barcode 7 of a POS ID is different in the code system from a barcode of a commodity code. The processor 501 determines the type of the barcode according to the difference in the code system.

If the barcode data represent a commodity code (Yes in Act 26: commodity detector), the processor 501 accesses the store server 40. Then, the processor 501 acquires, from the commodity database 41 of the store server 40, commodity data (e.g. commodity name, price) associated with the commodity code (Act 28).

The processor 501 generates commodity sales data containing a commodity code, a commodity name, a unit price, sales quantities, a sales amount (Act 29) after the processor 501 acquires the commodity data. Moreover, the processor 501 registers the commodity sales data in the commodity transaction file 510 specified by the self-registration ID attached to the barcode data (Act 30: storage module). Further, the processor 501 sends the commodity sales data to the portable information terminal 400 from which the barcode data have been originally sent (Act 31). The commodity sales data are wirelessly sent from the relay device 30 and received by the wireless unit 406 of the portable information terminal 400 that has sent the barcode data. Further, not limited to the foregoing sequence, Act 30 and Act 31 may be executed in a reverse sequence.

The processor 501 completing the processing in Act 30 and Act 31 waits until new barcode data are from the same portable information terminal 400 (Act 25).

As shown in FIG. 10, the processor 401 of the portable information terminal 400 which sends the barcode data waits until data are sent from the support server 50 (Act 12). If the processor 401 receives data from the support server 50 (Yes in Act 12), the processor 401 determines whether or not the data are commodity sales data (Act 13). If it is determined that the data are commodity sales data (Yes in Act 13), the processor 401 displays the commodity name, the price, and the like of a purchased commodity contained in the commodity sales data in detail columns of the registration screen (Act 14). Then, the processor 401 waits for detection of a new barcode from an image captured by the camera unit 405 (Act 10).

In this way, the processor 401 of the portable information terminal 400 carries out Act 10-Act 14 every time a customer 4 photographs the barcode affixed on a commodity 5 using the camera unit 405. On the other hand, the support server 50 carries out Act 25-Act 31. As a result, a commodity transaction file 510 containing the self-registration ID of the customer 4 is formed in the transaction file region W4 of the support server 50. Then, the store information and the association flag F as well as the sales data (commodity data) of the commodity 5 purchased by the customer 4 are stored in the commodity transaction file 510.

The customer 4 who has finished shopping in the sales floor 6 goes to the checkout region 1 to carry out settlement operation. The settlement may be carried out at the checkout counter 2 or the self-service POS apparatus 20. To settle the payment for the commodities to be purchased at the checkout counter 2, the customer photographs the barcode 7 marked on the scanner 11 located on the checkout counter 2 using the camera unit 405. To settle the payment of purchased commodities using the self-service POS apparatus 20, the customer 4 photographs the barcode 7 marked on the housing of the POS apparatus 20 using the camera unit 405.

If the customer 4 photographs the barcode 7 using the camera unit 405, the processor 401 of the portable information terminal 400 carries out an operation same as the one carried out when the customer 4 photographs the barcode affixed on a commodity 5. That is, if a barcode is detected from an image obtained by the camera unit 405 (Yes in Act 10), the processor 401 attaches the self-registration ID stored in the self-registration management region W1 to the barcode data and wirelessly sends the barcode data along with the self-registration ID (Act 11). The barcode data containing the self-registration ID sent from the wireless unit 406 are received by the relay device 30 and transmitted therefrom to the support server 50 via the LAN 70.

On the other hand, if the processor 501 receives the barcode data containing the self-registration ID (Yes in Act 25), the processor 501 of the support server 50 determines whether the data are a barcode of a commodity code or a barcode 7 of a POS ID (Act 26 and Act 27). If the data are a barcode 7 of a POS ID (Yes in Act 27), the processor 501 determines that the POS apparatus 10 or 20 corresponding to the POS ID is a settlement object (settlement POS apparatus) (Act 32).

For example, the processor 501 inquires each of the POS apparatuses 10 and 20 that are connected with each other via the LAN 70 about the POS ID. Moreover, the processor 501 determines that the POS apparatus 10 or 20 in response to the POS ID detected according to the barcode data is a settlement POS apparatus. The processor 501 sends a settlement request to the settlement POS apparatus 10 or 20 if the settlement POS apparatus 10 or 20 is determined (Act 33). Here, the settlement request is sent to the settlement POS apparatus 10 or 20 via the LAN 70.

The processor 101 of the settlement POS apparatus 10 or 20 receiving the settlement request carries out a process in accordance with the procedure shown in FIG. 12. That is, the processor 101 determines whether or not a commodity transaction is being continued (Act 41).

In case of the self-service POS apparatus 20, the commodity transaction of the customer 4 is ended when another customer photographs a barcode 7 using the camera unit 405 thereof. However, in case of the facing-type POS apparatuses 10, the commodity transaction of the customer 4 may not be ended even when another customer photographs a barcode 7 using the camera unit 405 thereof. If the commodity transaction of a customer is not ended, the processor 101 determines that a commodity transaction is being continued. In this case (Yes in Act 41), the processor 101 waits for completion of the commodity transaction. If the commodity transaction is completed (No in Act 41), the processor 101 sends an approval response to the support server 50 (Act 42).

As shown in FIG. 11, the processor 501 of the support server 50 which has sent the settlement request to the settlement POS apparatus 10 or 20 waits for an approval response (Act 34). After receiving the approval response from the settlement POS apparatus 10 or 20 (Yes in Act 34), the processor 501 detects the commodity transaction file 510 having the self-registration ID attached to the barcode data. Then, the processor 501 sends the data in the commodity transaction file 510 to the settlement POS apparatus 10 or 20 (Act 35: a first transmitting module).

As shown in FIG. 12, the processor 101 of the settlement POS apparatus 10 or 20 which has sent the approval response to the support server 50 waits for the commodity transaction file 510 (Act 43). The processor 101 loads the commodity sales data contained in the commodity transaction file 510 to the transaction region of the main memory 102, if the processor 101 receives the data contained in the commodity transaction file 510 from the support server 50 via the communication interface 504 (Yes in Act 43). Then, the processor 101 displays the information, such as the commodity name and the price, contained in the commodity sales data loaded to the transaction region, on the display 13a or the touch panel 22 (Act 44).

Then, the processor 101 waits for input of payment data (Act 45). If the barcode of a commodity is read by the scanner 11 or 21 while processor 101 is waiting for the input of payment data, the processor 101 identifies the commodity according to the barcode and loads the sales data thereof to the transaction region.

If payment data are input via the keyboard 12 or the touch panel 22 (Yes in Act 45), then the processor 101 carries out, according to the payment data, a settlement process corresponding to the commodity sales data stored in the transaction region. During the settlement process, the processor 101 generates print data of the receipt data (Act 46: a generation module).

After the settlement process is ended, the processor 101 checks the association flag F contained in the commodity transaction file 510 sent from the support server 50 (Act 47). Here, if the association flag F is set to be '1', the customer 4 completing a self-registration operation sets the association of the self-registration system with the electronic receipt system. If the association of the self-registration system with the electronic receipt system is set (Act 47: Yes), the processor 101 generates an electronic receipt by formatting the receipt data (Act 48). Further, the processor 101 displays, on the display 13a or the touch panel 22, a screen to inquire the customer 4 about whether or not to issue a paper receipt. Moreover, the processor 101 waits for an input indicating whether or not to issue a paper receipt (Act 49: a reception module).

Here, if an input indicating no issue of a paper receipt is received through the operation on the keyboard 12 or touch panel 22 (No in Act 49), the processor 101 adds the self-registration ID contained in the commodity transaction file 510 to the electronic receipt. Then, the processor 101 sends the electronic receipt having the self-registration ID added thereto, to the electronic receipt server 80 (Act 50: a second transmitting module).

On the other hand, if an input indicating issue of a paper receipt is received through the operation on the keyboard 12 or touch panel 22 (Yes in Act 49), the processor 101 controls the printer 14 or 24 to issue a paper receipt (Act 51: a control module). Also if the association flag F contained in the commodity transaction file 510 is set as '0' (No in Act 47), the processor 101 causes a paper receipt to be issued (Act 51).

In this way, if the electronic receipt is sent to the electronic receipt server 80 or issue of a paper receipt is instructed, the processor 101 sends a settlement end command to the support server 50 (Act 52). Then, the processor 101 ends the process carried out when a settlement request is received.

As shown in FIG. 11, the processor 501 of the support server 50 which has sent the commodity transaction file 510 to the settlement POS apparatus 10 or 20 waits for a settlement end command (Act 36). If the processor 501 receives a settlement end command from the settlement POS apparatus 10 or 20 (Yes in Act 36), the processor 501 wirelessly sends the settlement end command to the portable information terminal 400 which has sent the barcode data of a POS ID (Act 37). Further, the processor 501 deletes the commodity transaction file 510 the data in which is sent to the settlement POS apparatus 10 or 20, from the transaction file region W4 (Act 38). Then, the processor 501 ends the process carried out after the registration start command is received. Further, not limited to the foregoing sequence, Act 37 and Act 38 may be executed in a reverse sequence. Further, the commodity transaction file 510 deleted from the transaction file region W4 may also be stored in another region formed in the auxiliary storage device 503.

As shown in FIG. 10, the processor 401 of the portable information terminal 400 which receives the barcode data waits for data from the support server 50 (Act 12). If the data are received from the support server 50 (Yes in Act 12), the processor 401 determines whether or not the data are commodity sales data (Act 13). If the received data are not commodity sales data (No in Act 13), the processor 401 determines whether or not the received data are an end command (Act 15). If the data received are the end command (Yes in Act 15), the processor 401 deletes the registration screen displayed on the touch panel 404 (Act 16). Then, the processor 401 ends the process carried out according to the self-registration terminal program P1.

As shown in FIG. 13, the processor 801 of the electronic receipt server 80 waits to receive data (Act 61). After the processor 801 receives the data via the network 200 (Yes in Act 61), the processor 801 determines whether or not the data received are an electronic receipt (Act 62). If it is determined that the received data is an electronic receipt (Yes in Act 62), the processor 801 identifies the ID included in the data is a self-registration ID or an electronic receipt ID (Act 63).

If an electronic receipt ID is added to the electronic receipt (No in Act 63), the processor 801 generates an electronic receipt file 810 containing the electronic receipt ID and the electronic receipt, and stores the generated electronic receipt file 810 in the electronic receipt region W5 (Act 65).

If a self-registration ID is added to the electronic receipt (Yes in Act 63), the processor 801 retrieves the linkage table 820. Then, the processor 801 searches an electronic receipt ID set in the linkage table 820 in association with the self-registration ID (Act 64). Then, the processor 801 converts the self-registration ID to the electronic receipt ID found in the linkage table 820. After converting the self-registration ID into the electronic receipt ID, the processor 801 generates an electronic receipt file 810 containing the electronic receipt ID obtained by the conversion and the electronic receipt and stores the generated electronic receipt file 810 in the electronic receipt region W5 (Act 65). Then, the processor 801 ends the process carried out when an electronic receipt is received.

In this way, the self-registration ID of a customer 4 who completed a self-registration operation is added to the electronic receipt of a commodity transaction of the commodities registered through the self-registration operation, and the electric receipt data containing the self-registration ID are sent to the electronic receipt server 80. If the electronic receipt contains the self-registration ID, the electronic receipt server 80 converts the self-registration ID into the electronic receipt ID of the customer 4. Then, the electronic receipt server 80 generates an electronic receipt file 810 containing the electronic receipt ID and stores the generated electronic receipt file 810 in the electronic receipt region W5. On the other hand, when the electronic receipt server 80 receives electronic receipt containing an electronic receipt ID but not a self-registration ID, the electronic receipt server 80 generates an electronic receipt file 810 containing the electronic receipt ID and stores the generated electronic receipt file 810 in the electronic receipt region W5.

The electronic receipt ID is used as an authentication ID for the customer 4 who is an electronic receipt member (subscriber) to log in the electronic receipt server 80 from the portable information terminal 400. Thus, the customer 4 who completed a self-registration operation using the portable information terminal 400 can browse, using the portable information terminal 400, the electronic receipt for the commodity transaction of the commodities registered through the self-registration operation.

Further, not limited to the portable information terminal 400, the apparatus that can log in the electronic receipt server 80 using an electronic receipt ID may also function as the information processing apparatus 210 such as a personal computer and the like. Thus, an electronic receipt for a commodity transaction of the commodities registered through a self-registration operation may also be browsed on the information processing apparatus 210 such as a personal computer and the like.

Moreover, the customer 4 and the cashier 3 do not need to input an electronic receipt ID using the POS apparatus 10 or 20 for the commodities registered through a self-registration operation. As a result, the association of the self-registration system with the electronic receipt system causes no increased workload for the customer 4 and the cashier 3.

According to the present embodiment, the self-registration system can simplify the commodity registration by the cashier and reduce time required for the settlement process. In addition, the electronic receipt system can reduce time required to issue paper receipts. By combining the self-registration system and the electronic receipt system, processing speed of the checkout region 1 can be largely improved, which leads to reduction of customers' wait time at the checkout region 1. Further, as the customers 4 do not need to present their electronic receipt ID at the checkout region 1, customer convenience can be improved.

In the present embodiment, the POS apparatuses 10, 20 generate the electronic receipt and transmit it to the electronic receipt server 80. Alternatively, the store server 40 or the support server 50 may generate the electronic receipt and transmit it to the electronic receipt server 80.

In case of the store server 40, the commodity sales data or the payment data that are necessary to generate the electronic receipt are transmitted from the POS apparatuses 10, 20 to the store server 40. On the other hand, in case of the support server 50, the payment data and the self-registration ID are transmitted from the POS apparatuses 10, 20 to the support server 50, because the commodity sales data are stored in the commodity transaction file 510 of the support server 50.

Second Embodiment

Next, a second embodiment is described below with reference to FIG. 14-FIG. 16. Here, elements shown in FIG. 14-FIG. 16 that correspond to those described in the first embodiment are depicted with same reference signs and therefore may not be described in detail.

Figure 14:
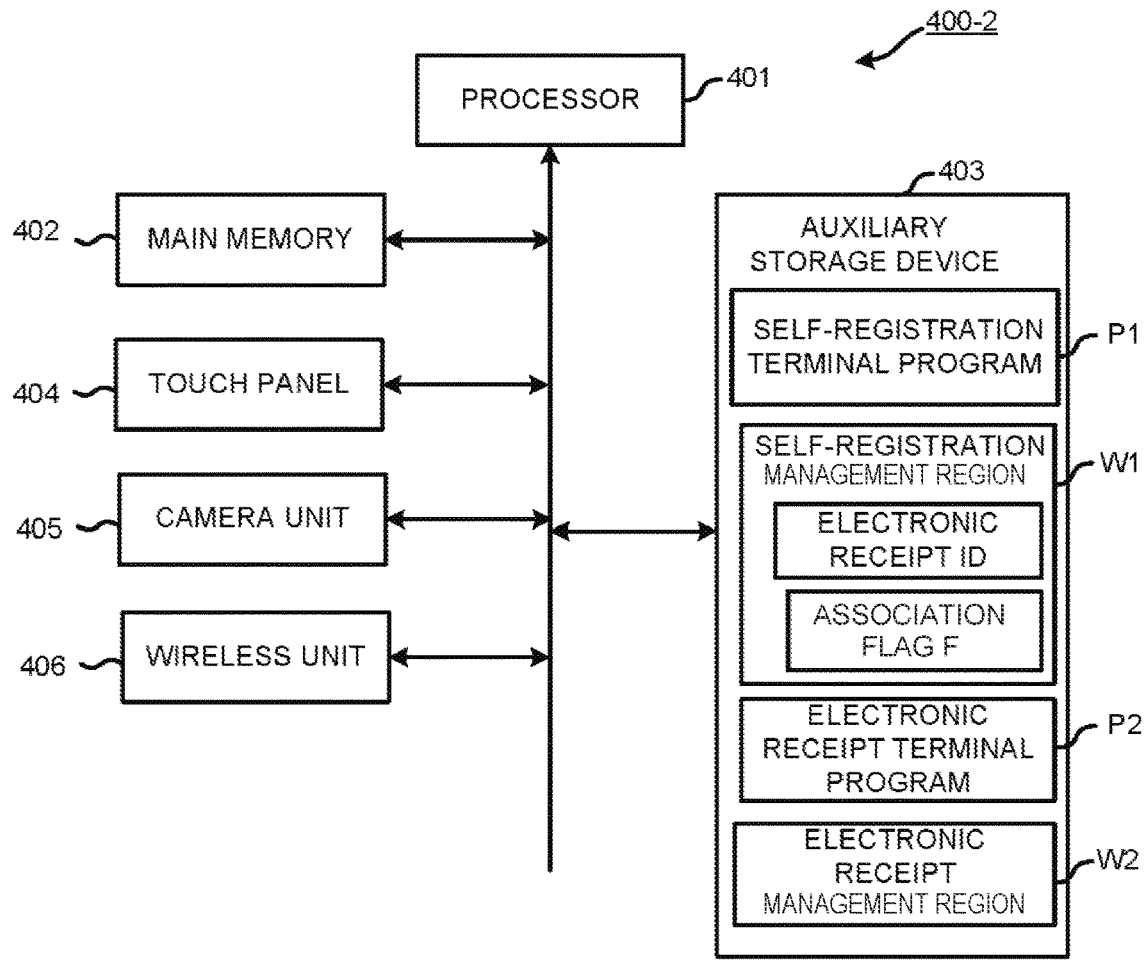
FIG. 14 is a block diagram of a portable information terminal according to a second embodiment.

FIG. 14 is a block diagram of a portable information terminal 400-2 according to the second embodiment. The portable information terminal 400-2 is different from the portable information terminal 400 according to the first embodiment in the data stored in the self-registration management region W1 of the auxiliary storage device 403. That is, the portable information terminal 400-2 stores an electronic receipt ID in the self-registration management region W1.

Similar to the first embodiment, in the second embodiment, the customer 4 determines whether or not the self-registration system is associated with the electronic receipt system. If it is set that the self-registration system is associated with the electronic receipt system, the processor 401 of the portable information terminal 400 sets an association flag F in the self-registration management region W1. Further, the processor 401 stores the electronic receipt ID used by the customer 4 to log in the electronic receipt server 80 in the self-registration management region W1.

The electronic receipt ID is stored in the electronic receipt management region W2 by logging in the electronic receipt server 80. When setting the association of the self-registration system with the electronic receipt system, the customer 4 starts the electronic receipt terminal program P2 in advance to log into the electronic receipt server 80. If so, the electronic receipt ID is stored in electronic receipt management region W2, and then the processor 401 copies the electronic receipt ID stored in the electronic receipt management region W2 to the self-registration management region W1. The processor 401 also sets the association flag F. The electronic receipt ID is not deleted even if the customer 4 logs out of the electronic receipt server 80. Similarly, the association flag F is not reset, even if the customer 4 logs out of the electronic receipt server 80. That is, if the association of the self-registration system with the electronic receipt system is set, the electronic receipt ID is stored and the association flag F is set in the self-registration management region W1. When the association of the self-registration system with the electronic receipt system is deactivated, the customer 4 launches the self-registration program P1 and performs a predetermined operation to delete the electronic receipt ID from the electronic receipt management region W2, and to clear the association flag.

Figure 15:
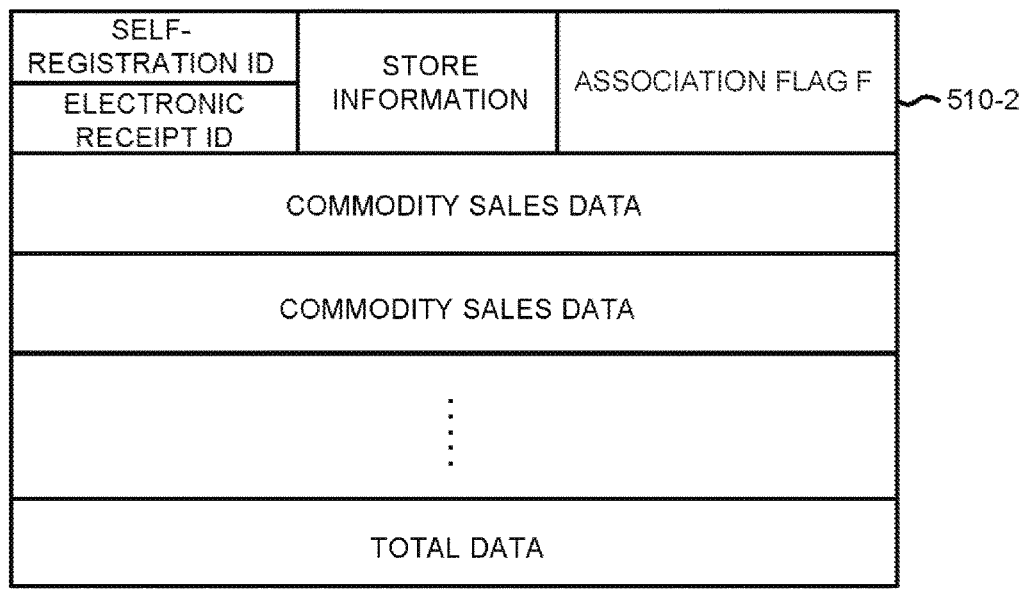
FIG. 15 schematically illustrates a data structure of a commodity transaction file according to the second embodiment.

FIG. 15 schematically illustrates a data structure of a commodity transaction file 510-2 stored in the transaction file region W4 of the support server 50 according to the second embodiment. The commodity transaction file 510-2 according to the second embodiment is different from the commodity transaction file 510 according to the first embodiment in the number of types of the IDs stored therein. Only a self-registration ID is stored in the commodity transaction file 510 according to the first embodiment. However, besides the self-registration ID, an electronic receipt ID is also stored in the commodity transaction file 510-2 according to the second embodiment.

Figure 16:
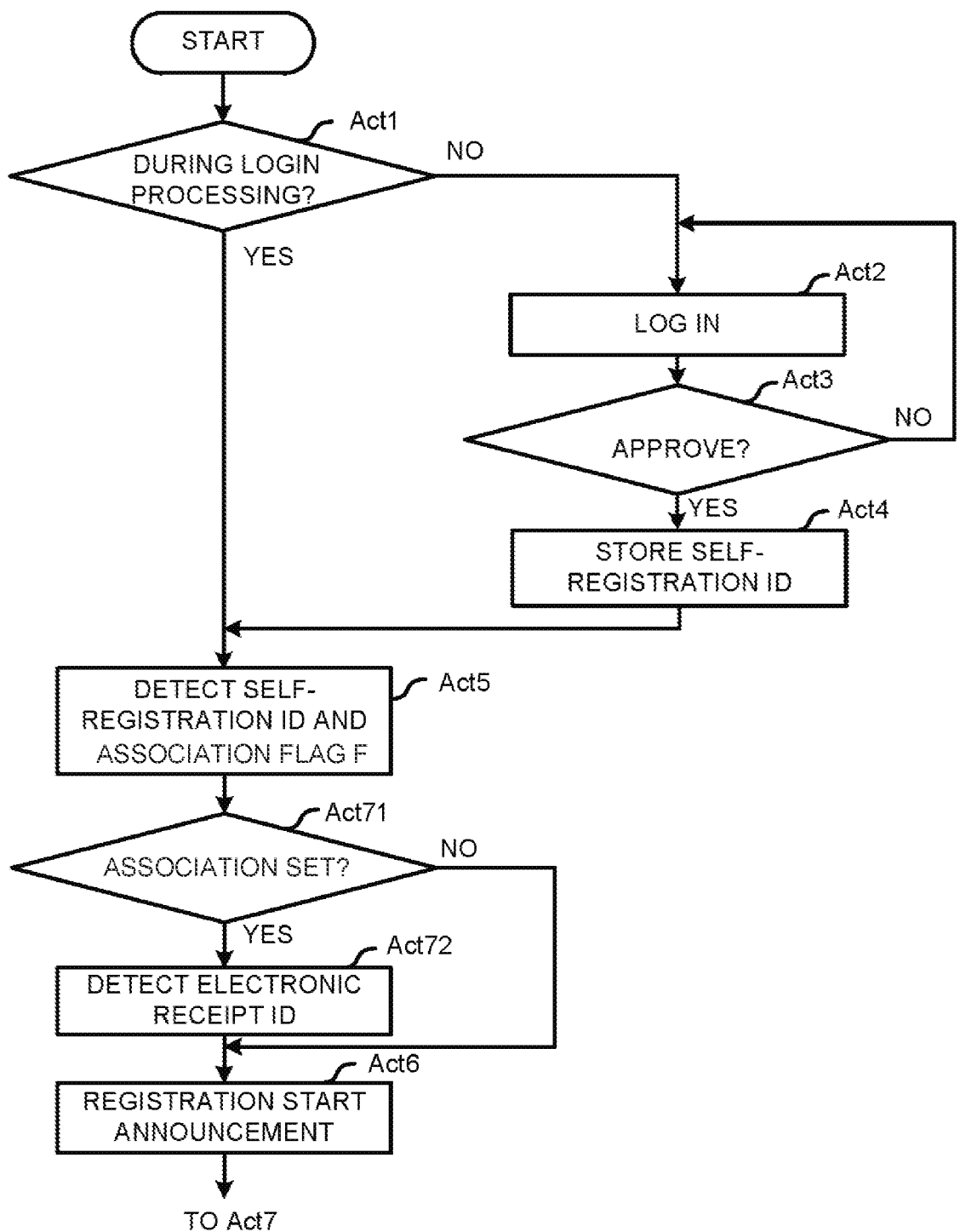
FIG. 16 is a flowchart illustrating a part of a process carried out by a processor of the portable information terminal according to a self-registration terminal program in the second embodiment.

FIG. 16 is a flowchart illustrating a part of a process carried out by the processor 401 of the portable information terminal 400-2 in accordance with the self-registration terminal program P1 in the second embodiment. As shown in FIG. 16, in the second embodiment, Acts 71 and 72 are performed between Act 5 (detecting a self-registration ID and an association flag F) and Act 6 (sending a registration start command).

That is, the processor 401 carries out Act 71 after completing Act 5. In Act 71, the processor 401 determines whether or not an association flag F is detected in the self-registration management region W1. No association flag F is detected if the association of the self-registration system with the electronic receipt system is not set in the portable information terminal 400. In this case, the processor 401 carries out Act 6 as the result of Act 71 is determined to be 'No'. That is, the processor 401 wirelessly sends the registration start command which is acquired from the self-registration management region W1 containing the self-registration ID and the association flag F.

In contrast, the association flag F is detected if the association of the self-registration system with the electronic receipt system is set in the portable information terminal 400-2. In this case, the processor 401 carries out Act 72 as the result of Act 71 is determined to be 'Yes'.

In Act 72, the processor 401 detects an electronic receipt ID from the self-registration management region W1. After detecting an electronic receipt ID, the processor 401 carries out Act 6. That is, the processor 401 wirelessly sends the registration start command containing a self-registration ID, an electronic receipt ID, and the association flag F, which are acquired from the self-registration management region W1. The process carried out after Act 6 in the second embodiment is the same as that carried out after Act 6 in the first embodiment.

Then, similarly to the first embodiment, after receiving the registration start command, the support server 50 carries out a process according to the procedure shown in FIG. 11. However, Act 23 in the second embodiment is partially different from Act 23 in the first embodiment. Specifically, in Act 23 of the first embodiment, the processor 501 generates a commodity transaction file 510 according to the self-registration ID and the association flag F that are contained in the received registration start command, and the store information acquired in Act 22. In contrast, in Act 23 of the second embodiment, the processor 501 also generates a commodity transaction file 510 according to the self-registration ID and the association flag F that are contained in the registration start command.

However, as described with reference to FIG. 16, in addition to the self-registration ID and the association flag F, an electronic receipt ID may be also contained in the registration start command in some cases. In these cases, the processor 501 generates a commodity transaction file 510-2 in Act 23. That is, the processor 501 generates the commodity transaction file 510-2 (storage module) according to the self-registration ID and the association flag F that are contained in the received registration start command and the store information acquired in Act 22.

Further, similarly to the first embodiment, the processor 101 of the POS apparatus 10 or 20 that receives the settlement request carries out a process in accordance with the procedure shown in FIG. 12. However, in Act 5, the processor 101 attaches the electronic receipt ID contained in the commodity transaction file 510-2 to an electronic receipt. The self-registration ID is not added to the electronic receipt. The processor 101 sends the electronic receipt containing the electronic receipt ID to the electronic receipt server 80 (second transmitting module).

Similarly to the first embodiment, the processor 801 of the electronic receipt server 80 that receives the electronic receipt carries out a process in accordance with the procedure shown in FIG. 13. However, as the ID added to the electronic receipt is an electronic receipt ID, the result of the determination of Act 63 should be 'NO.' Thus, Act 64 is not executed. For that reason, in the second embodiment, the linkage table 820 is not needed in the electronic receipt server 80.

According to the second embodiment, the self-registration system can be associated with the electronic receipt system d without increasing the workload of the customer 4 and the cashier 3 in a similar manner as the first embodiment. As a result, the processing speed of the checkout region 1 can be largely improved, and customers' wait time can be reduced. Also, as the customers 4 do not need to present their electronic receipt ID at the checkout region 1, customer convenience can be improved.

Moreover, according to the second embodiment, it would be beneficial that a conventional electronic receipt server can be used as the electronic receipt server 80.

Further, according to the second embodiment, the customer 4 can change the setting of whether to receive a paper receipt or an electronic receipt, by changing the setting of the association flag F in the portable information terminal 400-2. It would be easy for the customer to change the setting in each purchase transaction.

In the second embodiment, the association flag F is set in the portable information terminal 400-2, but the association flag F may not be set therein in other embodiments. For example, the electronic receipt server may contain a member database, which stores the association flag F for each electronic receipt ID. Then, if the registration start command from the portable information terminal 400-2 contains the electronic receipt ID, the processor 501 of the support server 50 may receive the association flag F in the member database, and store the received association flag F in the commodity transaction file 510-2.

Third Embodiment

Next, a third embodiment is described below with reference to FIG. 17-FIG. 18. Here, elements shown in FIG. 17-FIG. 18 that correspond to those described in the first embodiment are depicted with the same reference signs and not described in detail.

Figure 17:
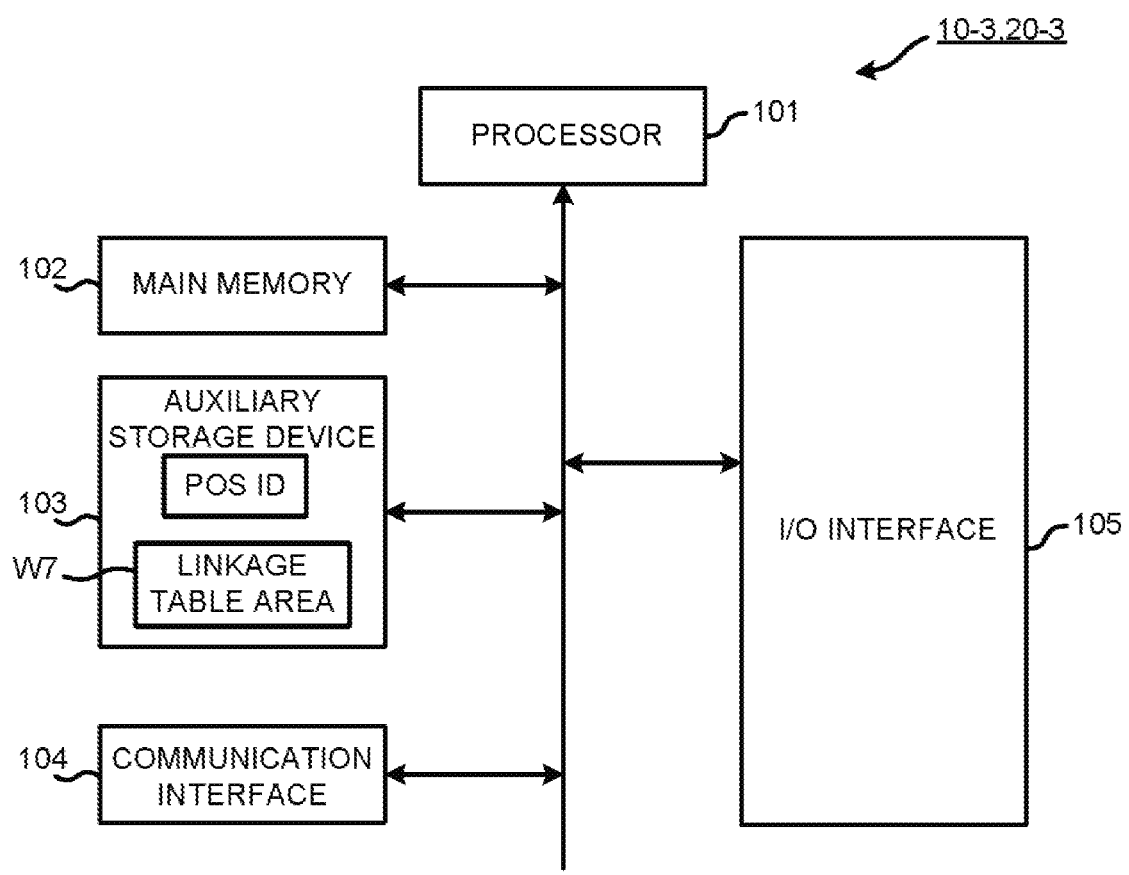
FIG. 17 is a block diagram of a POS apparatus according to a third embodiment.

FIG. 17 is a block diagram of a POS apparatus 10-3 or 20-3 according to the third embodiment. The POS apparatus 10-3 or 20-3 is different from the POS apparatus 10 or 20 in formation of a linkage table region W7 in the auxiliary storage device 103. The linkage table region W7 is a region for storing a linkage table 820 having the data structure shown in FIG. 9.

In the first embodiment, the electronic receipt server 80 comprises a linkage table 820. In the third embodiment, the POS apparatus 10-3 or 20-3 comprises a linkage table 820, and the electronic receipt server 80 comprises no linkage table 820.

Figure 18:
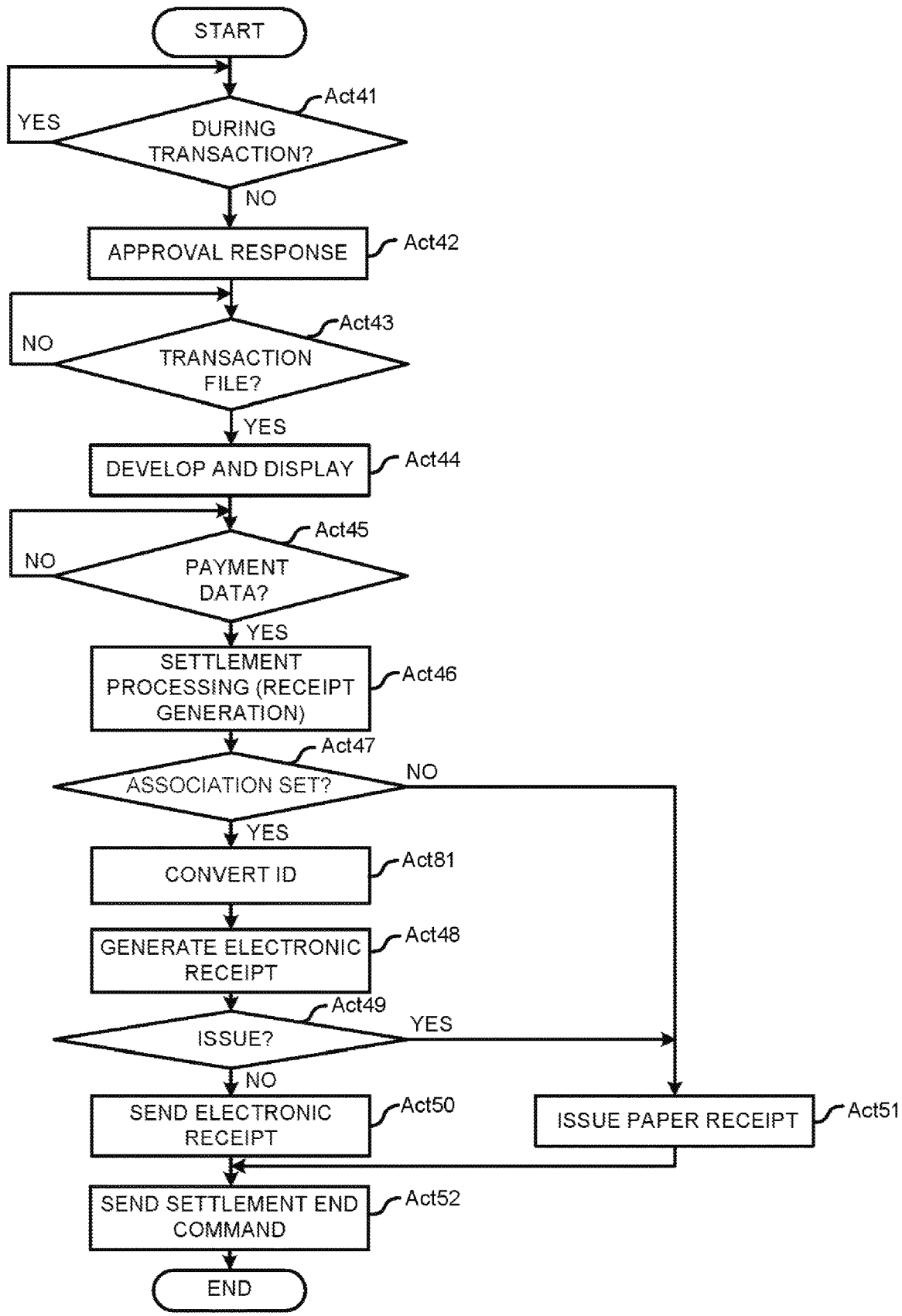
FIG. 18 is a flowchart illustrating a main procedure of a process carried out by a processor of the POS apparatus according to a control program in the third embodiment when the POS apparatus receives a settlement request.

FIG. 18 is a flowchart illustrating a main procedure of a process carried out by the processor 101 of the POS apparatus 10-3 or 20-3 according to a control program when the POS apparatus 10 or 20 receives the settlement request (described below). Further, the procedure (FIG. 10) of the process carried out by the processor 401 of the portable information terminal 400 according to the self-registration terminal program P1 and the procedure (FIG. 11) of the process carried out by the processor 501 of the support server 50 according to the self-registration server program P3 in the third embodiment are the same as those described in the first embodiment, and therefore not described here.

The third embodiment is different from the first embodiment in that Act 48 is carried out after Act 81 if the result of the determination in Act 47 is 'Yes', as shown in FIG. 18.

That is, if it is determined that the association flag F contained in the commodity transaction file 510 sent from the support server 50 is set as '1' (Yes in Act 47), the processor 101 searches the linkage table 820 for the electronic receipt ID set in the linkage table 820 in association with the self-registration ID, and converts the self-registration ID into the electronic receipt ID (Act 81). Then, the processor 101 generates an electronic receipt by formatting the receipt data (Act 48). Further, not limited to the foregoing sequence, Act 81 and Act 48 may be executed in a reverse sequence.

That is, in the third embodiment, the POS apparatuses 10-3 and 20-3 both comprise a linkage table 820. If the association flag F contained in the commodity transaction file 510 sent from the support server 50 is set as '1', the POS apparatus 10-3 or 20-3 converts the self-registration ID to an electronic receipt ID. Moreover, the POS apparatus 10-3 or 20-3 adds the electronic receipt ID in the electronic receipt generated based on the commodity sales data stored in the commodity transaction file 510 and sends the processed electronic receipt to the electronic receipt server 80.

As a result, also according to the third embodiment, the self-registration system can be associated with the electronic receipt system without increasing the workload of the customer 4 and the cashier 3. Further, the processing speed of the checkout region 1 can be largely improved, and customers' wait time can be reduced. Also, as the customers 4 do not need to present their electronic receipt ID at the checkout region 1, customer convenience can be improved.

Moreover, as an electronic receipt containing an electronic receipt ID is sent to the electronic receipt server 80, a conventional electronic receipt can be used as the electronic receipt server 80.

In the present embodiment, the POS apparatuses 10, 20 generate the electronic receipt and transmit it to the electronic receipt server 80. Alternatively, the store server 40 or the support server 50 may generate the electronic receipt and transmit it to the electronic receipt server 80.

In case of the store server 40, the commodity sales data or the payment data that are necessary to generate the electronic receipt are transmitted from the POS apparatuses 10, 20 to the store server 40. On the other hand, in case of the support server 50, the payment data and the self-registration ID are transmitted from the POS apparatuses 10, 20 to the support server 50, because the commodity sales data are stored in the commodity transaction file 510 of the support server 50.

Fourth Embodiment

A fourth embodiment is described below with reference to FIG. 19-FIG. 28. Here, elements and steps shown in FIG. 19-FIG. 28 that correspond to those described in the first embodiment are depicted with same reference signs and therefore may not be described in detail. In the present embodiment, a terminal ID is used instead of or in addition to the self-registration ID.

[Portable Information Terminal]

The portable information terminal 400 according to the fourth embodiment has a storage region W0 for storing a terminal ID in the auxiliary storage device 403. The terminal ID is an ID unique to the portable information terminal 400, such as a phone number.

[Support Server (Commodity Data Input Support Server)]

The data in the commodity transaction file 510 further consists of the terminal ID, in addition to the self-registration ID, store information, the association flag F, one or more commodity sales data, and total data described in the first embodiment.

That is, the commodity transaction file 510 functions as a storage module which stores the commodity data of a sales commodity associated with a commodity code input from the portable information terminal 400, in association with the terminal ID of the portable information terminal 400 and the self-registration ID of the customer 4. Here, the commodity data may be stored in a file same as the one containing the terminal ID and the self-registration ID or, alternatively, different from the one.

[Electronic Receipt Server]

The data in the electronic receipt file 810 further consists of the terminal ID, in addition to the electronic receipt ID, the simplified data of an electronic receipt consisting of a store name, the transaction date and time and a total amount, and the actual data of the electronic receipt.

[Operations of Commodity Sales Processing System]

Next, an operation carried out by the commodity sales processing system when the self-registration system is associated with the electronic receipt system is described below with reference to flowcharts of FIG. 19-FIG. 22. FIG.

Figure 22:
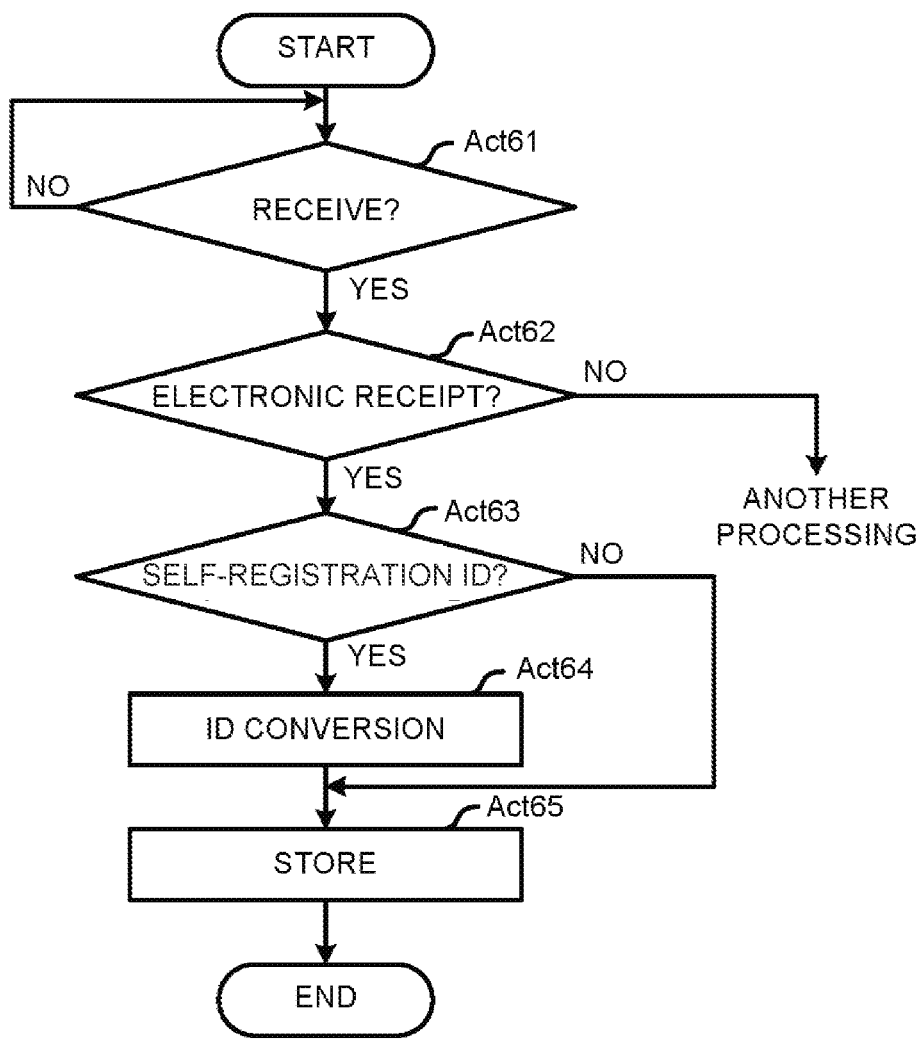
FIG. 22 is a flowchart illustrating a procedure of a process carried out by a processor of an electronic receipt server according to the fourth embodiment.

19-FIG. 22 in the present embodiment correspond to FIG. 10-FIG. 13 in the first embodiment, respectively.

Figure 19:
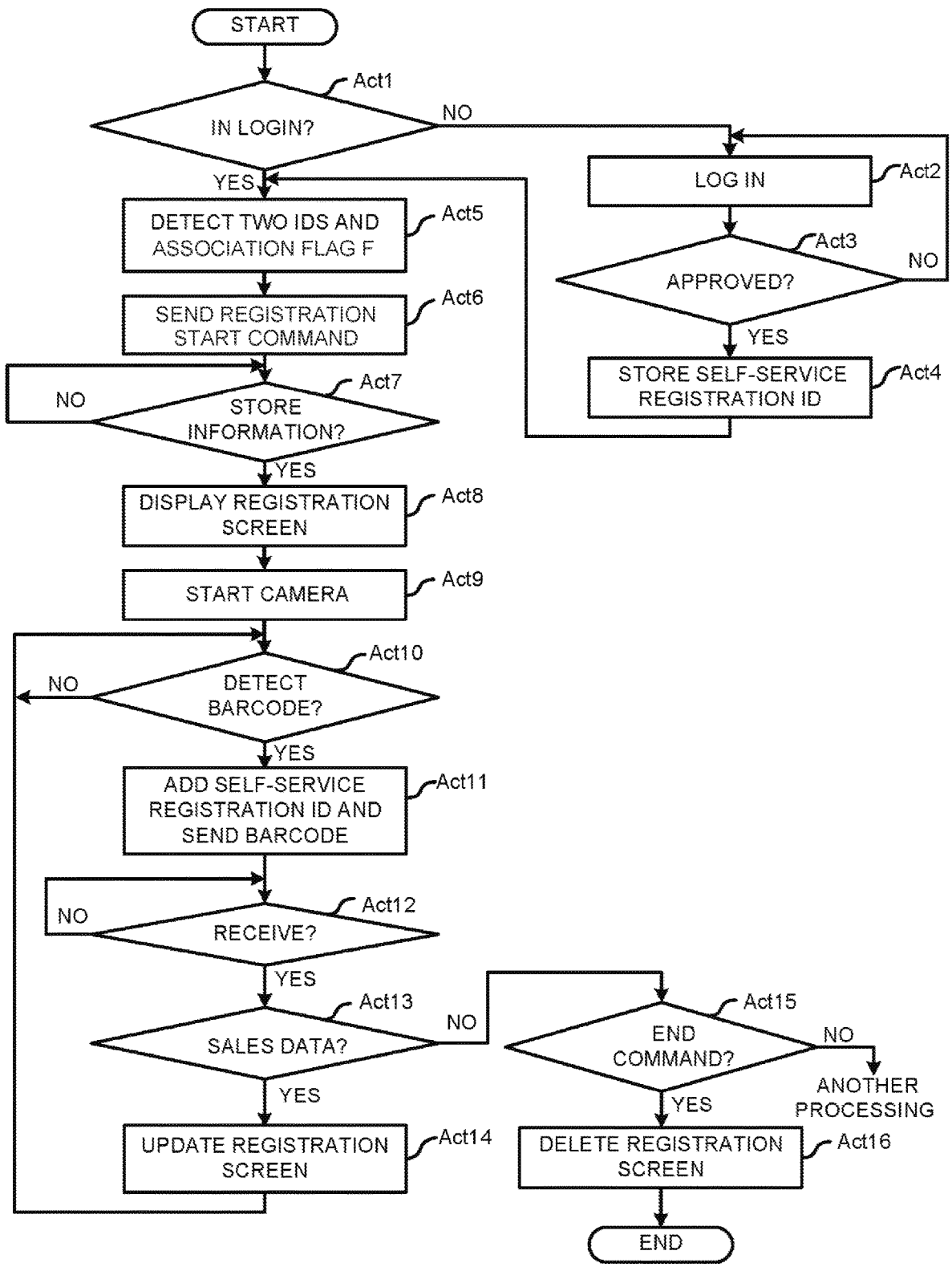
FIG. 19 is a flowchart illustrating a procedure of a process carried out by a processor of the portable information terminal according to a fourth embodiment.

In Act 5 in FIG. 19, the processor 401 further searches the terminal ID in the terminal ID region W0, in addition to the search of the self-registration ID in the self-registration management region W1. Then, in Act 6, the processor 401 wirelessly sends the registration start command containing the self-registration ID, the terminal ID, and the association flag F.

Figure 20:
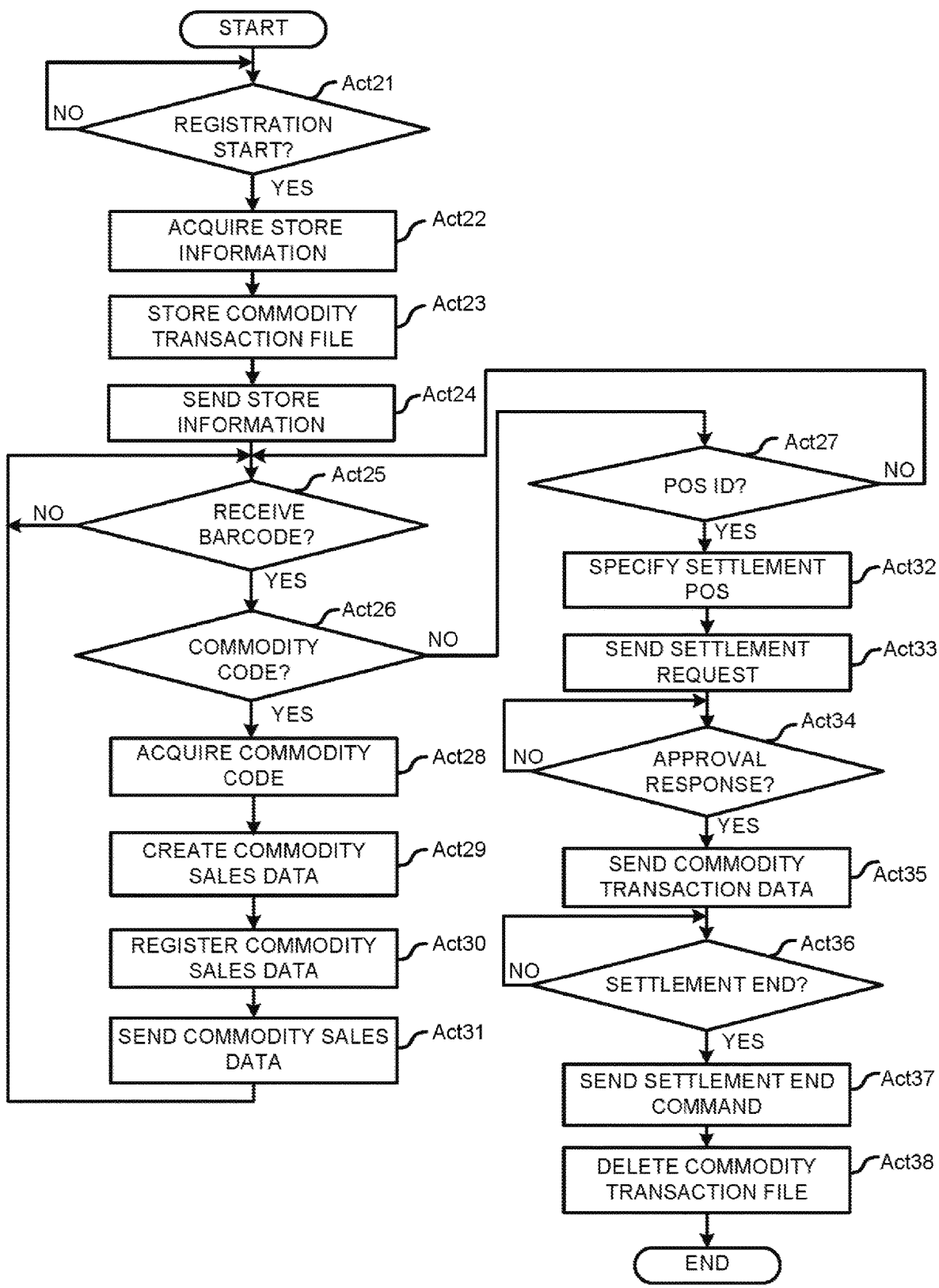
FIG. 20 is a flowchart illustrating a procedure of a process carried out by a processor of the support server according to the fourth embodiment.

In Act 23 in FIG. 20, the processor 501 of the support server 50, after receiving the registration start command, stores the self-registration ID, the terminal ID, and the association flag F in the registration start command in the commodity transaction file 510.

As a result, a commodity transaction file 510 containing the self-registration ID of the customer 4 and the terminal ID of the portable information terminal 400 used by the customer 4 is formed in the transaction file region W4 of the support server 50.

In Act 35, the processor 501 of the support server 50 sends the commodity data stored in the commodity transaction file 510, and the terminal ID and the self-registration ID, to the POS apparatus 10 or 20 associated with a POS ID input from the portable information terminal 400. Here, the processor 501 may send the commodity data, together with or separately from the terminal ID and the self-registration ID.

Figure 21:
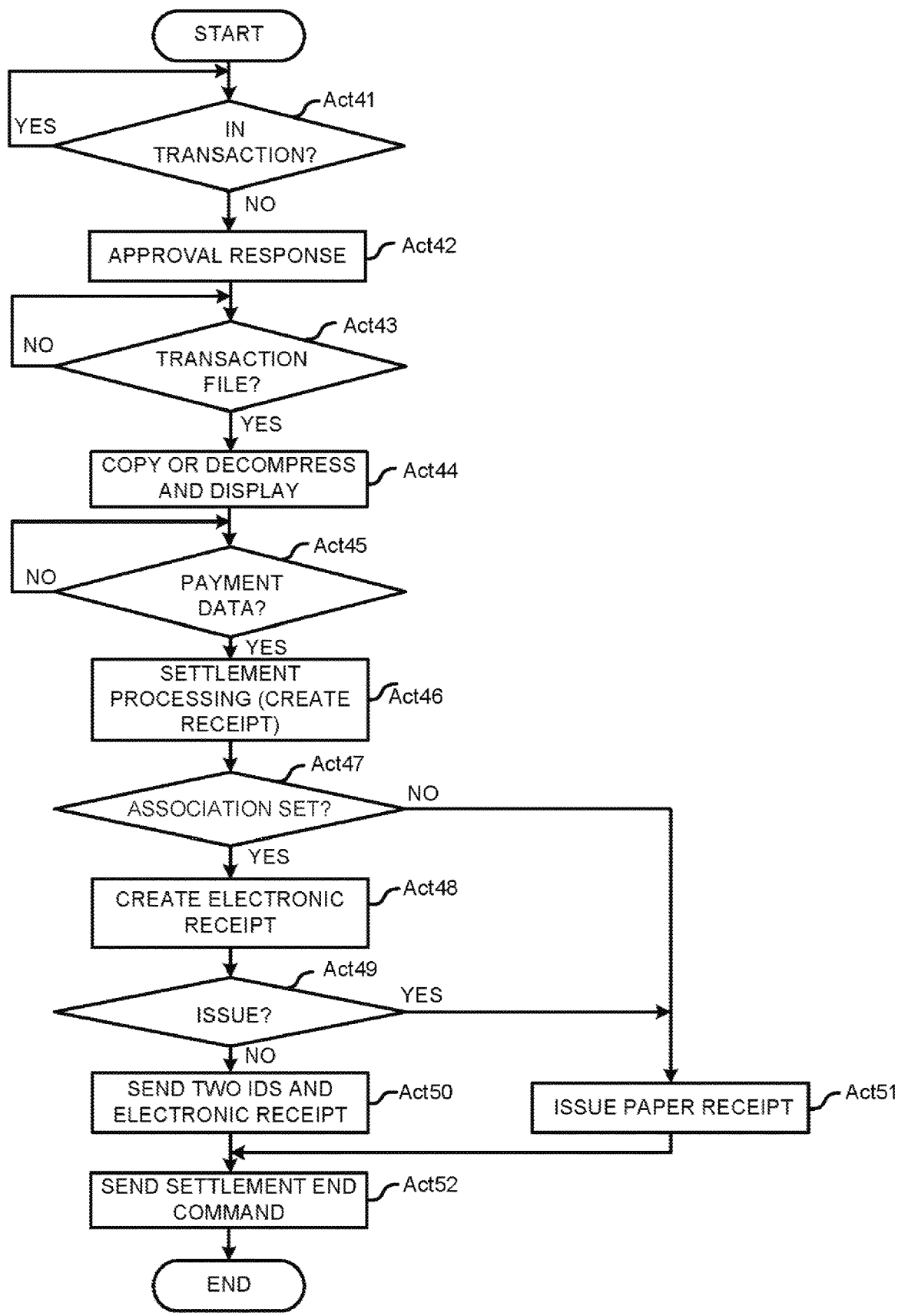
FIG. 21 is a flowchart illustrating a procedure of a process carried out by a processor of the POS apparatus according to the fourth embodiment.

If the input indicating no issue of a paper receipt is received through the operation on the keyboard 12 or touch panel 22 (No in Act 49) in FIG. 21, the processor 101 further adds the terminal ID to the electronic receipt, in addition to the self-registration ID. Then, in Act 50, the processor 101 sends the electronic receipt along with the self-registration ID and the terminal ID to the electronic receipt server 80.

In FIG. 22, if an electronic receipt ID is added to the electronic receipt (Act 63: No), the processor 801 creates an electronic receipt file 810 containing the electronic receipt ID and the electronic receipt and stores the created electronic receipt file 810 in the electronic receipt region W5 (Act 65). Here, no terminal ID is stored in the electronic receipt file 810.

If a self-registration ID is not added to the electronic receipt (Act 63: Yes), the processor 801 searches the linkage table 820. Then, the processor 801 converts the self-registration ID to an electronic receipt ID which is associated therewith in the linkage table 820 (Act 64: a conversion module). After converting the self-registration ID to the electronic receipt ID, the processor 801 creates an electronic receipt file 810 according to the converted electronic receipt ID and the electronic receipt, and stores the created electronic receipt file 810 in the electronic receipt region W5. Here, the processor 801 stores the terminal ID attached to the electronic receipt together with the self-registration ID in the created electronic receipt file 810 (Act 65). Then, the processor 801 ends the process carried out when receiving the electronic receipt.

The processor 801 and the electronic receipt file 810 function as a storage module which stores the electronic receipt in association with the electronic receipt ID corresponding to the self-registration ID, and the terminal ID, with reference to the linkage table 820, when the terminal ID and the self-registration ID are associated with the electronic receipt received from the POS apparatus 10 or 20.

In this way, the electronic receipt for the transaction of the commodities registered by the customer through the self-registration transmitted to the electronic receipt server 80, together with the self-registration ID of the customer 4 and the terminal ID of the portable information terminal 400 used by the customer 4. If the electronic receipt contains the self-registration ID, the electronic receipt server 80 converts the self-registration ID to the electronic receipt ID of the customer 4. Then, the electronic receipt server 80 creates an electronic receipt file 810 containing the electronic receipt ID and the terminal ID, and stores the created electronic receipt file 810 in the electronic receipt region W5. On the other hand, if an electronic receipt containing an electronic receipt ID rather than the self-registration ID, the electronic receipt server 80 creates an electronic receipt file 810 containing the electronic receipt ID and stores the created electronic receipt file 810 in the electronic receipt region W5.

In the electronic receipt file 810, in addition to the electronic receipt ID, the terminal ID is also stored. The terminal ID is unique to the portable information terminal 400. Thus, using the portable information terminal 400 containing the electronic receipt terminal program P1, an electronic receipt can be retrieved with a terminal ID, instead of an electronic receipt ID.

Figure 23:
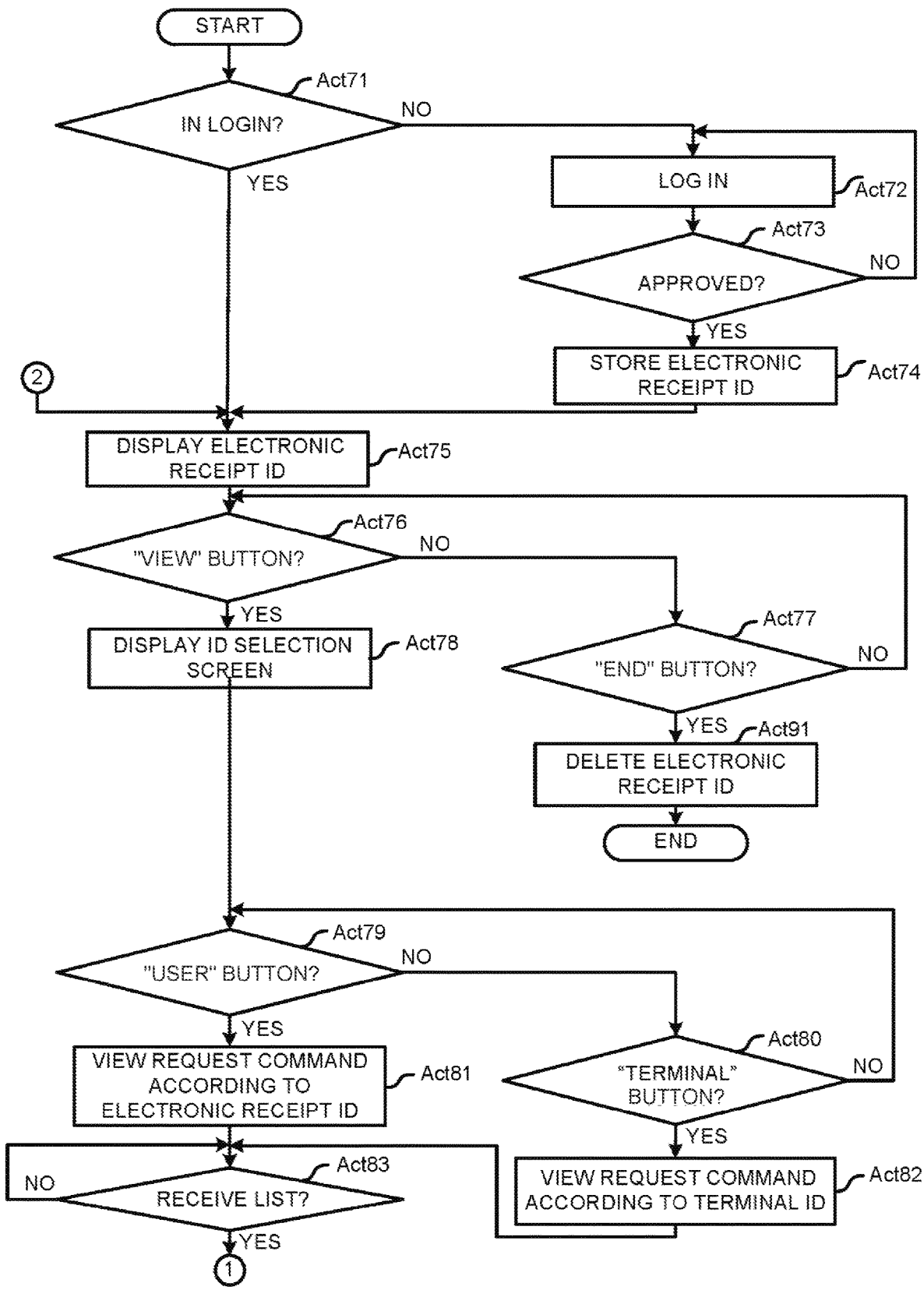
FIG. 23 is a flowchart illustrating a procedure of a process carried out by a processor of a portable information terminal according to the fourth embodiment.
Figure 24:
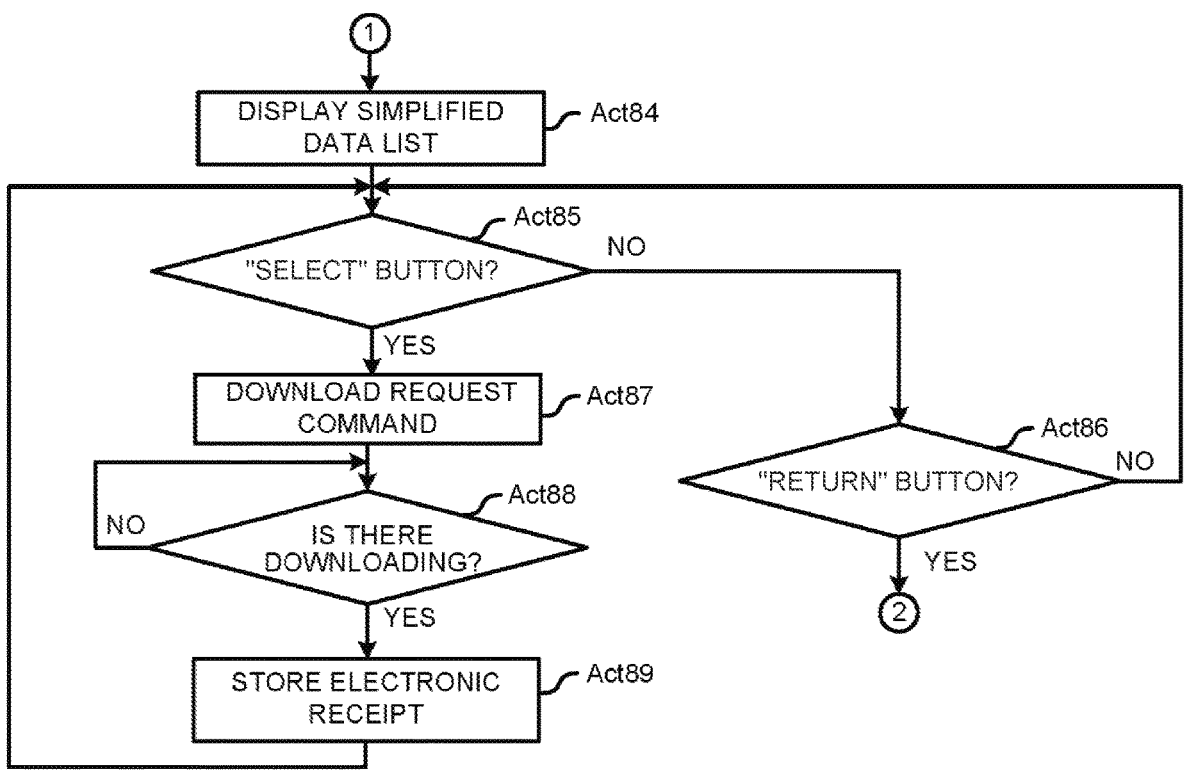
FIG. 24 is a flowchart illustrating a procedure of a process carried out by a processor of a portable information terminal according to the fourth embodiment.
Figure 25:
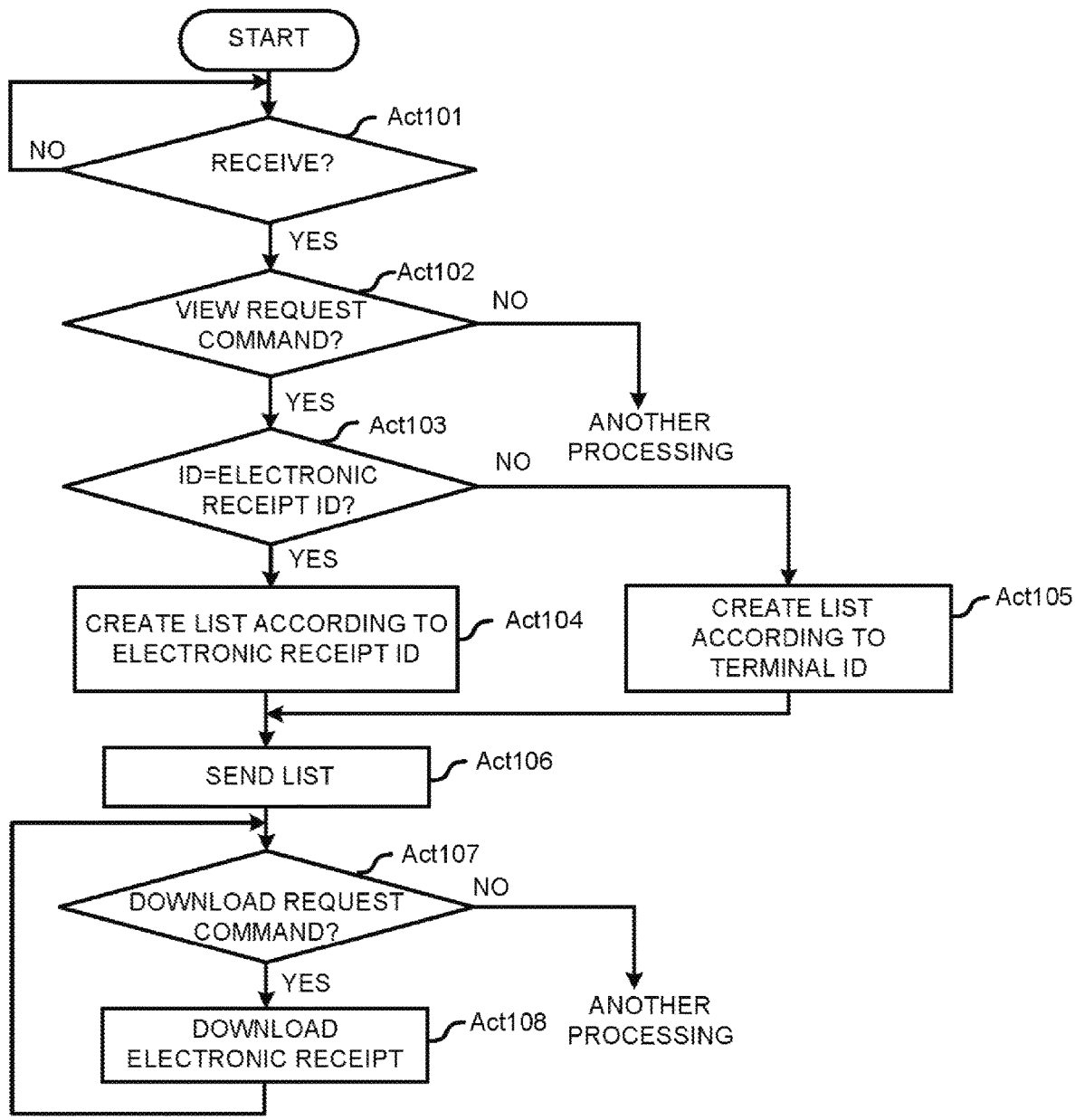
FIG. 25 is a flowchart illustrating a procedure of a process carried out by a processor of an electronic receipt server according to the fourth embodiment.
Figure 26:
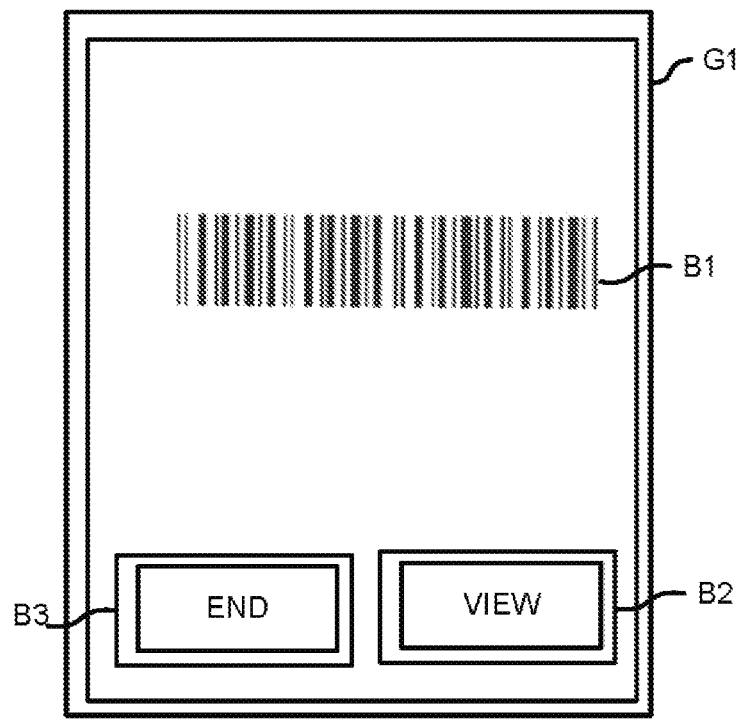
FIGS. 26-28 each schematically illustrate a screen displayed on a touch panel of the portable information terminal according to the fourth embodiment.
Figure 27:
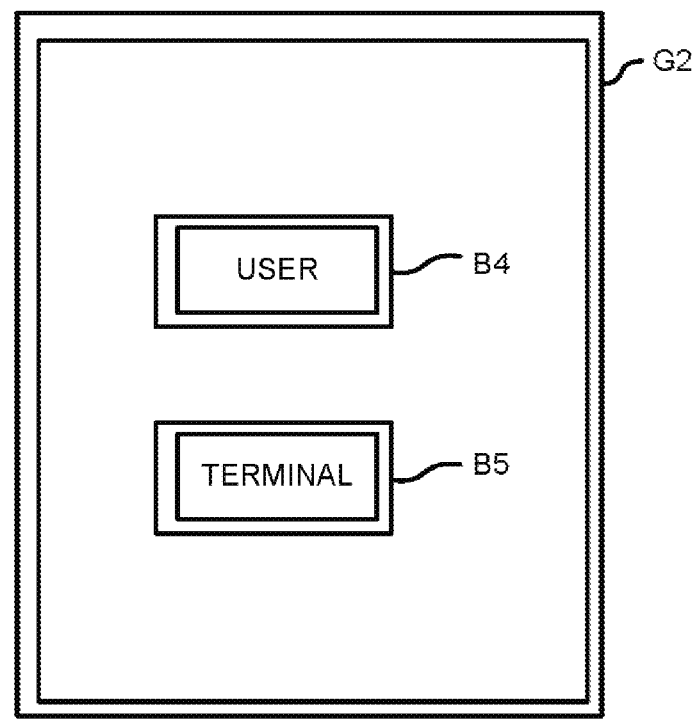
Figure 28:
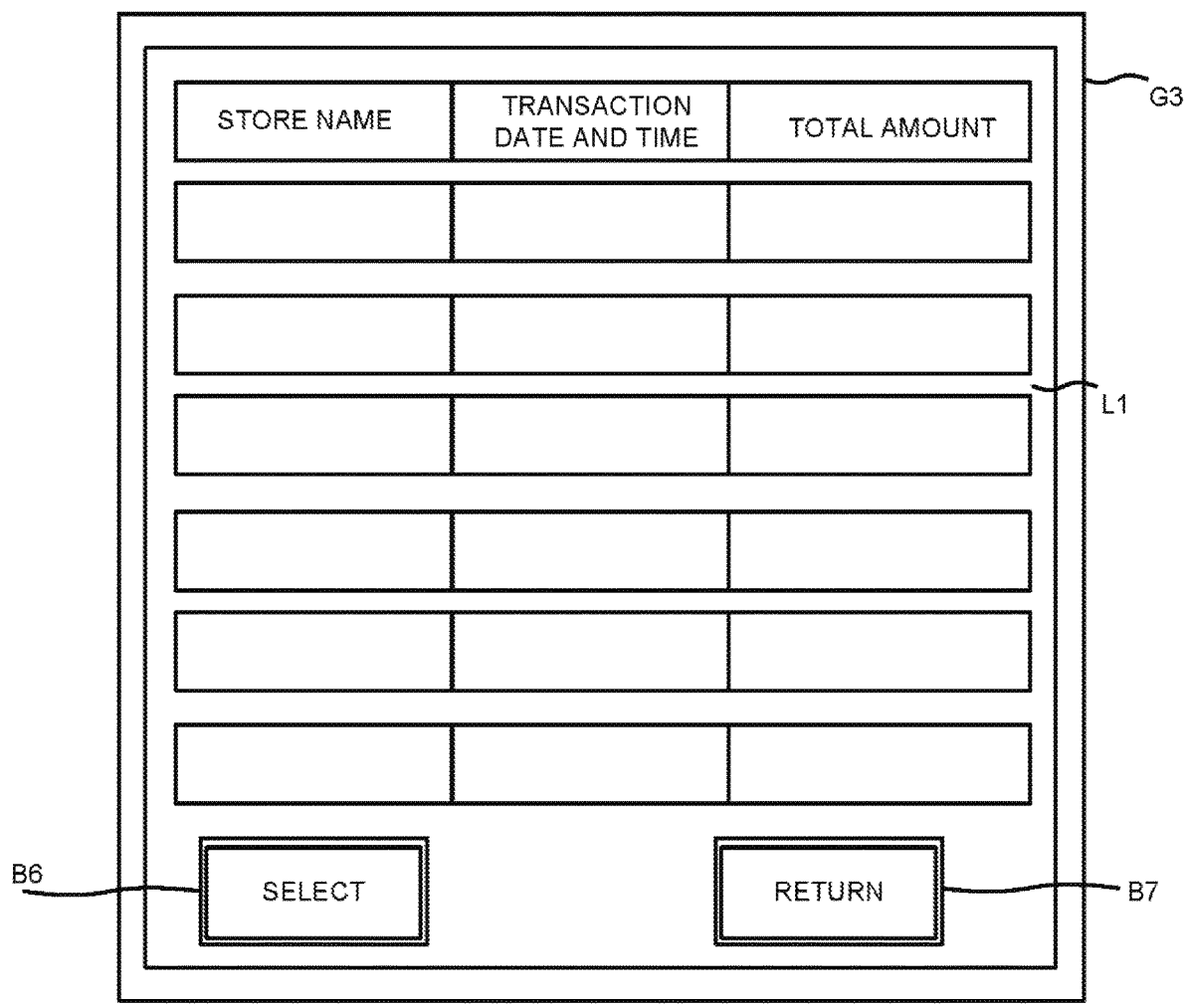

Next, the operations to view, on the portable information terminal 400, the electronic receipt generated through the association of the self-registration system with the electronic receipt system are described with reference to FIG. 23-FIG. 28. FIG. 23 and FIG. 24 are flowcharts illustrating a main procedure of a process carried out by the processor 401 of the portable information terminal 400 according to the electronic receipt terminal program P2. FIG. 25 is a flowchart illustrating a main procedure of a process carried out by the processor 801 of the electronic receipt server 80 according to the electronic receipt server program P4. FIG. 26-FIG. 28 schematically illustrate a screen displayed on the touch panel 404 of the portable information terminal 400. Further, the content of each process described below with reference to FIG. 23-FIG. 25 is merely an example, and other processes that can achieve the same effect can be performed properly.

The customer 4 who desires to view an electronic receipt operates the touch panel 404 of the portable information terminal 400 to activate the electronic receipt terminal program P2. To activate it, the customer touches the icon of the electronic receipt terminal program P2 displayed on the touch panel 404. If the electronic receipt terminal program P2 is activated, the processor 401 of the portable information terminal 400 starts the process shown in the flowchart of FIG. 23.

First, the processor 401 determines whether or not the electronic receipt server 80 is being logged into (Act 71). If the electronic receipt terminal program P2 is ended without being logged out, the login state is maintained. An electronic receipt ID used as an authentication ID is stored in the electronic receipt management region W2 during the login process.

If the electronic receipt server 80 is not being logged into (Act 81: No), the processor 401 displays a login screen on the touch panel 404 for login (Act 72). The customer 4 inputs own electronic receipt ID on the login screen to log in. The customer 4 may input an electronic receipt ID and a password.

If the customer 4 logs in, the processor 401 wirelessly sends login information containing the electronic receipt ID. The log information wirelessly sent from the wireless unit 406 is received by a base station (not shown) and sequentially forwarded to the electronic receipt server 80 via the network 200. The electronic receipt server 80 authenticates the login. Moreover, the electronic receipt server 80 notifies the portable information terminal 400 of the result of the authentication through a route inverse to that of login information.

The processor 401 determines whether or not the login is approved (Act 73). If it is determined that the login is not approved (Act 73: No), the processor 401 may perform the login operation again (Act 72). If it is determined that the login is approved (Act 73: Yes), the processor 401 stores the electronic receipt ID used for the login in the electronic receipt management region W2 (Act 74).

If the electronic receipt ID is stored in the electronic receipt management region W2 as the login is approved or when the login is ongoing (Act 71: Yes), the processor 401 displays the electronic receipt ID on the touch panel 404 (Act 75).

FIG. 26 illustrates an example of a screen G1 displayed on the touch panel 404 in Act 75. As shown in FIG. 26, a barcode B1, a 'view' button B2 and an 'end' button B3 are displayed on the screen G1. The barcode B1 represents the electronic receipt ID. An electronic receipt member who does not set the association with the self-registration system but prefers reception of the electronic receipt uses the scanner 11 or 21 of the POS apparatus 10 or 20 to read the barcode of the electronic receipt ID when settling a commodity transaction. Then, electronic data indicating the details of the commodity transaction are sent to the electronic receipt server 80 along with the electronic receipt ID. As a result, an electronic receipt file 810 in which the electronic receipt ID and the electronic receipt are stored is stored in the electronic receipt region W5 of the electronic receipt server 80.

The customer 4 viewing the screen G1 selects the 'view' button B2 to view the electronic receipt stored in the electronic receipt server 80. The customer 4 selects the 'end' button B3 to end the view of the electronic receipt.

The processor 401 waits for the selection of the 'view' button B2 or the 'end' button B3 displayed on the screen G1 (Act 76 and Act 77). If the selection of the 'view' button B2 is received (Act 76: Yes), the processor 401 displays an ID selection screen on the touch panel 404 (Act 78).

FIG. 27 illustrates an example of a screen G2 displayed on the touch panel 404 in Act 78. As shown in FIG. 27, a 'user' button B4 and a 'terminal' button B5 are displayed on the screen G2.

To search an electronic receipt by an electronic receipt ID, the customer 4 selects the 'user' button B4. To search an electronic receipt by a terminal ID, the customer 4 selects the 'terminal' button B5.

The processor 401 waits for the selection of the 'user' button B4 or the 'terminal' button B5 displayed on the screen G2 (Act79 and Act 80). If the selection of the 'user' button B4 is received (Act 79: Yes), the processor 401 sends a view request command containing the electronic receipt ID to the electronic receipt server 80 (Act 81). If the selection of the 'terminal' button B5 is received (Act 80: Yes), the processor 401 sends a view request command containing the terminal ID to the electronic receipt server 80 (Act 82). The view request command wirelessly sent from the wireless unit 406 is received by the base station and sequentially received by the electronic receipt server 80 via the network 200.

As shown in FIG. 25, the processor 801 of the electronic receipt server 80 waits to receive data (Act 101). If the data are received via the network 200 (Act 101: Yes), the processor 801 determines whether or not the received data are a view request command (Act 102). If it is determined that the received data are a view request command (Act 102:

Yes), the processor 801 determines whether the ID contained in the command is an electronic receipt ID or a terminal ID (Act 103: identification module). An electronic receipt ID is different from a terminal ID in code system. The processor 801 determines whether the ID contained in the command is an electronic receipt ID or a terminal ID according to the difference in code system. Further, not limited to the determination method based on a code system, the ID contained in the command may also be identified according to the number of specific digits unique to the electronic receipt ID or the terminal ID.

If the ID contained in the view request command is an electronic receipt ID (Act 103: Yes), the processor 801 searches the electronic receipt region W5 for an electronic receipt file 810 containing the electronic receipt ID. Then, the processor 801 reads simplified data including a store name, a transaction date and time, and a total amount from each electronic receipt file 810 to create a list of simplified data (Act 104: creation module).

If the ID contained in the view request command is a terminal ID (Act 103: No), the processor 801 detects, from the electronic receipt region W5, an electronic receipt file 810 in which the terminal ID is stored. Moreover, the processor 801 reads simplified data including a store name, a transaction date and time and a total amount from each detected electronic receipt file 810 to create a list of simplified data (Act 105: creation module). The processor 801 sends the simplified data list representing the electronic receipt data found according to the electronic receipt ID or the simplified data list representing the electronic receipt data found according to the terminal ID to the portable information terminal 400 from which the view request command has been originally sent (Act 106: a third sending module).

The processor 401 of the portable information terminal 400 which has sent the view request command in Act 81 or Act 82 waits to receive the simplified data list from the electronic receipt server 80 (Act 83). If the processor 401 receives the simplified data list (Act 83: Yes), the processor 401 displays the simplified data list on the touch panel 404 (Act 84), as shown in FIG. 24.

FIG. 28 illustrates an example of a screen G3 displayed on the touch panel 404 in Act 84. As shown in FIG. 19, a simplified data list L1, a 'select' button B6, and a 'return' button B7 are displayed on the screen G3.

The content of the simplified data list L1 if the customer 4 selects the 'user' button B4 displayed on the screen G2, is different from that of the simplified data list L1 if the customer 4 selects the 'terminal' button B5 displayed on the screen G2. That is, the simplified data (the store name, the transaction date and time, and the total amount) of the electronic receipt file 810 containing the electronic receipt ID of the customer 4 are displayed in the simplified data list L1 if the customer 4 selects the 'user' button B4.

The electronic receipt file 810 containing the electronic receipt ID of the customer 4 is generated according to a commodity transaction with the customer 4. The commodity transaction may include not only a commodity transaction base on the self-registration through the portable information terminal 400, but also a commodity transaction based on a (direct) input to the POS apparatus 10 or 20. If the customer 4 uses a plurality of portable information terminals 400, the commodity transaction includes a commodity transaction corresponding to each portable information terminal 400. Thus, the simplified data of an electronic receipt generated according to a commodity transaction with the customer 4 is displayed in the simplified data list L1.

On the other hand, the simplified data (the store name, the transaction date and time, and the total amount) of an electronic receipt file 810 containing the terminal ID of the portable information terminal 400 are displayed in the simplified data list L1 if the customer 4 selects the 'terminal' icon B5.

An electronic receipt file 810 containing the terminal ID of a portable information terminal 400 is generated according to a self-registration through the portable information terminal 400 associated with the terminal ID. Thus, even for the same customer 4, the commodity transaction according to the self-registration through another portable information terminal 400 having different terminal ID is not searched, because the terminal ID is different. Thus, only the simplified data of an electronic receipt generated according to a commodity transaction through the specific portable information terminal 400 is displayed in the simplified data list L1.

The customer 4 viewing the simplified data list L1 selects (touches) a commodity transaction and selects the 'select' button B6, to download the corresponding electronic receipt from the list. The customer 4 selects the 'return' button B7 to end the display of the simplified data list L1.

The processor 401 of the portable information terminal 400 displaying the simplified data list L1 waits for the selection of the 'select' button B6 (Act 85) or the 'return' button (Act 86). If the 'select' button is selected (Act 85: Yes), the processor 401 sends a download request command requesting the electronic receipt corresponding to the simplified data selected (touched) from the simplified data list L1, to the electronic receipt server 80 (Act 87). The download request command is received by the electronic receipt server 80 via the network 200.

The processor 801 of the electronic receipt server 80 which sends the simplified data list waits to receive the download request command (Act 107). If the download request command is received from the portable information terminal 400 (Act 107: Yes), the processor 801 reads the electronic receipt requested from the electronic receipt file 810 containing the selected simplified data. Then, the processor 801 downloads the data of the electronic receipt in the portable information terminal 400 from which the download request command has been originally sent (Act 108).

The processor 401 of the portable information terminal 400 which has sent the download request command waits to receive the download of the electronic receipt (Act 88). If the electronic receipt is downloaded via the wireless unit 406, then the processor 401 stores the electronic receipt in the electronic receipt management region W2 of the auxiliary storage device 403 (Act 89). Sequentially, the processor 401 waits for the selection of the 'select' button B6 (Act 85) or the selection of the 'return' button (Act 86).

If the 'return' icon B7 is selected (Act 86: Yes), the processor 401 returns to carry out Act 75. That is, the processor 401 causes the screen of the touch panel to return to the display screen G1 of the electronic receipt ID. The processor 401 waits for the selection of the 'view' button B2 (Act 76) or the 'end' button B3 (Act 77).

If the 'end' button B3 is selected (Act 77: Yes), the processor 401 deletes the display screen G1 of the electronic receipt ID (Act 91). Then, the processor 401 ends the process carried out according to the electronic receipt terminal program P2.

The data of the electronic receipt stored in the electronic receipt management region W2 of the portable information terminal 400 are displayed on the touch panel 404 of the portable information terminal 400. By selecting the 'user' button B4 on the screen G2, the customer 4 can view the electronic receipt associated with the electronic receipt ID, which is used by the customer 4 to log into the electronic receipt server 80. Further, by selecting the 'terminal' button B5 on the screen G2, the customer 4 can view the electronic receipt associated with the terminal ID of the portable information terminal 400 used by the customer 4.

For example, it is assumed that a first portable information terminal 400a is used by the customer 4 for the self-registration during five commodity transactions and a second portable information terminal 400b is used by the (same) customer 4 for the self-registration of another five commodity transactions. Moreover, it is assumed that the customer 4 receives an electronic receipt for each commodity transaction.

In this case, in either one of the portable information terminals 400a or 400b, by selecting the 'user' button B4 on the screen G2, a simplified data list L1 relating to electronic receipts for all ten commodity transactions is displayed on the touch panel 404 of the portable information terminal 400a or 400b.

On the other hand, if the 'terminal' button B5 is selected on the screen G2 displayed on the touch panel 404 of the portable information terminal 400a, a simplified data list L1 relating to electronic receipts for the five commodity transactions for which self-registrations are carried out using the portable information terminal 400a is displayed on the touch panel 404. Simplified data relating to electronic receipts for the other five commodity transactions for which self-registrations are carried out using the portable information terminal 400b are not included in the list L1.

Contrarily, a simplified data list L1 relating to electronic receipts for the five commodity transactions for which self-registrations are carried out using the portable information terminal 400b is displayed on the touch panel 404 of the portable information terminal 400b, if the 'terminal' button B5 is selected on the screen G2 displayed on the touch panel 404 of the portable information terminal 400b. Simplified data relating to electronic receipts for the other five commodity transactions for which self-registrations are carried out using the portable information terminal 400a are not included in the list L1.

Thus, a retrieval using the 'terminal' button B5 is effective if the customer 4 knows the commodity transaction carried out through the portable information terminal 400. A retrieval using the 'user' button B4 is effective if the commodity transaction is not through the self-registration, or if the customer 4 does not know the commodity transactions carried out through the portable information terminal 400.

Fifth Embodiment

Next, a fifth embodiment is described below with reference to FIG. 29-FIG. 30. Here, elements shown in FIG. 29-FIG. 30 that correspond to those described in the above embodiments are depicted with same reference signs and therefore may not be described in detail. The present embodiment corresponds to the second embodiment, and the terminal ID is used for the self-registration, similarly to the fourth embodiment.

Figure 29:
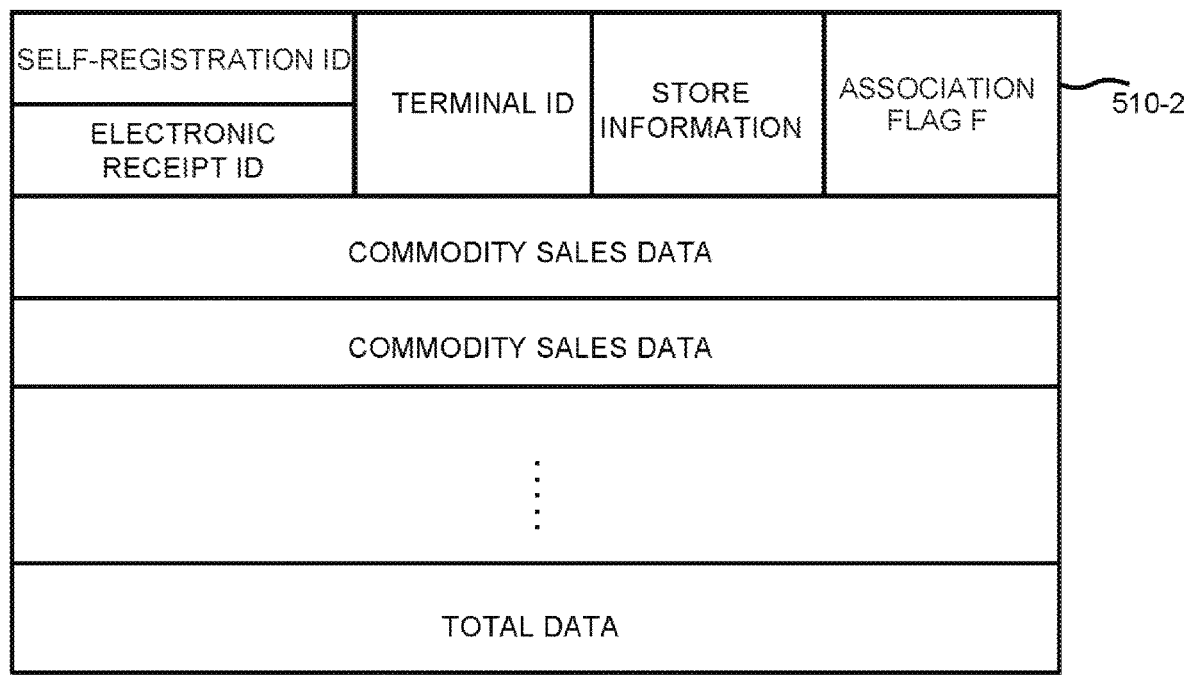
FIG. 29 schematically illustrates a data structure of a commodity transaction file according to a fifth embodiment.

FIG. 29 schematically illustrates a data structure of a commodity transaction file 510-2 stored in the transaction file region W4 of the support server 50 according to the fifth embodiment. The commodity transaction file 510-2 according to the fifth embodiment is different from the commodity transaction file 510 according to the fourth embodiment in the number of the stored IDs. A self-registration ID and a terminal ID are stored in the commodity transaction file 510 of the fourth embodiment. In addition to a self-registration ID and a terminal ID, an electronic receipt ID is also stored in the commodity transaction file 510-2 of the fifth embodiment.

Figure 30:
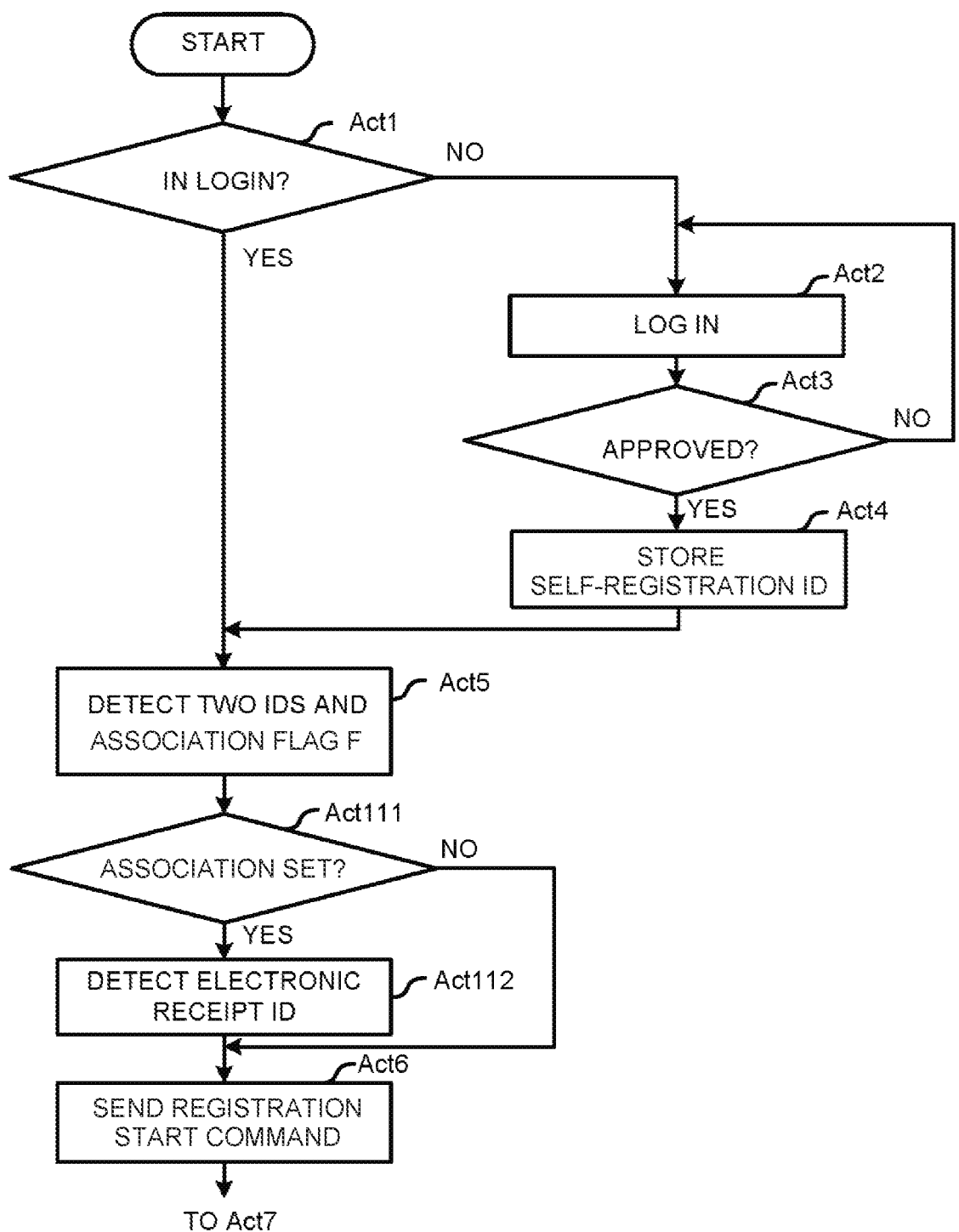
FIG. 30 is a flowchart illustrating a part of a process carried out by a processor of the portable information terminal according to the fifth embodiment.

FIG. 30 is a flowchart illustrating a part of a process carried out by the processor 401 of the portable information terminal 400-2 according to the self-registration terminal program P1 in the fifth embodiment. As shown in FIG. 30, in the fifth embodiment, Acts 111 and 112 are carried out between the detection process of a self-registration ID, a terminal ID, and an association flag F in Act 5 and the sending process of the registration start command in Act 6.

That is, the processor 401 carries out Act 111 after completing Act 5. In Act 111, the processor 401 determines whether or not an association flag F is detected in the self-registration management region W1. No association flag F can be detected if the association of the self-registration system with the electronic receipt system is not set by the portable information terminal 400-2. In this case, the processor 401 carries out Act 6, determining that the result of Act 111 is 'No'. That is, the processor 401 wirelessly sends the registration start command containing the self-registration ID, the terminal ID, and the association flag F acquired from the self-registration management region W1.

On the other hand, the association flag F is detected if the association of the self-registration system with the electronic receipt system is set by the portable information terminal 400-2. In this case, the processor 401 carries out Act 112, determining that the result of Act 111 is 'Yes'.

In Act 112, the processor 401 detects an electronic receipt ID from the self-registration management region W1. After detecting an electronic receipt ID, the processor 401 carries out Act 6. That is, the processor 401 wirelessly sends the registration start command containing the self-registration ID, the terminal ID, and the electronic receipt ID and the association flag F acquired from the self-registration management region W1. The process next to Act 6 of the fifth embodiment is the same as that next to Act 6 of the first embodiment.

Then, similarly to the first embodiment, after the support server 50 receives the registration start command, the support server 50 carries out a process according to the procedure shown in FIG. 11. However, Act 23 carried out in the fifth embodiment is partially different from Act 23 carried out in the first embodiment. That is, in the first embodiment, the processor 501 creates a commodity transaction file 510 according to the store information acquired in Act 22, the self-registration ID, the terminal ID, and the information indicated by the association flag F which are contained in the received start command in Act 23. In the fifth embodiment, in Act 23, the processor 501 creates a commodity transaction file 510 according to the self-registration ID, the terminal ID, and the association flag F contained in the registration start command.

However, in addition to the self-registration ID, the terminal ID, and the association flag F, an electronic receipt ID may be also contained in the registration start command in some cases. In these cases, the processor 501 creates a commodity transaction file 510-2 in Act 23. That is, the processor 501 creates a commodity transaction file 510-2 (storage module) according to the self-registration ID, the terminal ID, the electronic receipt ID and the association flag F that are contained in the received registration start command, and the store information acquired in Act 22.

Further, like in the first embodiment, the processor 101 of the POS apparatus 10 or 20 receiving the request command carries out a process according to the procedure shown in FIG. 12. During the process, the processor 101 adds the electronic receipt ID contained in the commodity transaction file 510-2, together with the terminal ID, in the data of the electronic receipt in Act 50. The self-registration ID is not attached to the electronic receipt. The processor 101 sends the electronic receipt associated with the electronic receipt ID and the terminal ID to the electronic receipt server 80.

Like in the first embodiment, the processor 801 of the electronic receipt server 80 that receives the electronic receipt carries out the process according to the procedure shown in FIG. 13. During this process, as the ID associated with the electronic receipt is an electronic receipt ID, the result of Act 63 should be 'NO.' Thus, Act 64 is not executed. That is, in the fifth embodiment, the linkage table 820 set in the electronic receipt server 80 is not needed.

Like in the first embodiment, in the fifth embodiment, the self-registration system can be associated with the electronic receipt system without increasing the workload of the customer 4 and cashier 3. Moreover, an electronic receipt corresponding to a commodity transaction conducted through the association of the self-registration system with the electronic receipt system can be retrieved from the electronic receipt server 80 by using the terminal ID of the portable information terminal 400-2 used in the self-registration as a search key.

Sixth Embodiment

Next, a sixth embodiment is described. The present embodiment corresponds to the third embodiment, and the terminal ID is used for the self-registration, similarly to the fourth embodiment.

According to the sixth embodiment, the self-registration system can be associated with the electronic receipt system without increasing the workload of the customer 4 and cashier 3. An electronic receipt for a commodity transaction conducted through the association of the self-registration system with the electronic receipt system can be retrieved from the electronic receipt server 80 using the terminal ID of the portable information terminal 400 used for the self-registration as a search key. Moreover, as an electronic receipt associated with an electronic receipt ID is sent to the electronic receipt server 80, a conventional electronic receipt can be used for the electronic receipt server 80. Although several embodiments are described, the present invention is not limited to the foregoing embodiments. For example, in the foregoing embodiments, whether or not to associate the self-registration system with the electronic receipt system can be set by the customer 4. Alternatively, the association of the self-registration system with the electronic receipt system may be fixed. In this case, the association flag F is not needed. Further, the processor 101 of the POS apparatus 10 or 20 does not need to carry out Act 47 shown in FIG. 12. Further, in the foregoing embodiments, the customer 4 can select a type of receipt to receive, i.e., a paper receipt or an electronic receipt. Alternatively, the electronic receipt may be always selected, and the paper receipt as an option. In this case, Acts 47, 49, and 51 shown in FIG. 12 may be omitted.

The second transmitting module can be any module that adds the self-registration ID to an electronic receipt and sends the processed electronic receipt to the electronic receipt server 80 when a self-registration ID is associated with the commodity sales data (commodity data) of commodity transaction to be settled, that is, the input of commodity data is through the self-registration operation with the portable information terminal 400.

Further, in the foregoing embodiments, a customer 4 itself registers commodity data using the portable information terminal 400, but the input of commodity data is not limited to the self-registration. For example, a shop clerk may accompany the customer 4 and operate the portable information terminal 400 to input the data of a commodity purchased by the customer 4.

Further, in the foregoing embodiments, in order to determine a POS apparatus 10 or 20 as a settlement object, the customer 4 photographs the barcode of the POS apparatus 10 or 20 using the camera unit 405. If the portable information terminal 400 is provided with a NFC (Near Field Communication) reader, a NFC tag instead of a barcode 7 may be attached to the POS apparatus 10 or 20, so that the NFC reader can read a POS ID from the NFC tag.

Further, in the first embodiment, in Act 64 the processor 801 of the electronic receipt server 80 converts the self-registration ID to the electronic receipt ID with reference to the linkage table 820. However, the conversion process may not be carried out. The processor 801 may only extract the electronic receipt ID which is set in the linkage table 820 in association with the self-registration ID. That is, the processor 801 may generate an electronic receipt file 810 containing the extracted electronic receipt ID and the electronic receipt, and stores the generated electronic receipt file 810 in the electronic receipt region W5 in Act 65.

Similarly, in Act 81 of the third embodiment, the processor 101 of the POS apparatus 10-3 or 20-3 converts the self-registration ID to an electronic receipt ID with reference to the linkage table 820. Alternatively, the processor 101 may extracts the electronic receipt ID set in the linkage table 820 in association with the self-registration ID. Then, the processor 101 may add the extracted electronic receipt ID to the electronic receipt and sends the processed electronic receipt to the electronic receipt server 80 in Act 50.

For example, in the foregoing embodiments, in Act 11 shown in FIG. 19, the processor 401 of the portable information terminal 400 embeds the self-registration ID in the barcode and wirelessly sends the barcode data containing the self-registration ID. Alternatively, in Act 11, the processor 401 may embeds the self-registration ID and the terminal ID in the barcode and wirelessly sends the barcode data.

Further, in the foregoing embodiments, in Act 78 shown in FIG. 23, the processor 401 of the portable information terminal 400 displays an ID selection screen on the touch panel 404. That is, in the foregoing embodiments, the keys for searching electronic receipts include an electronic receipt ID and a terminal ID. Alternatively, only the terminal ID can be used as the key for searching the electronic receipts. That is, the electronic receipt that can be searched by the portable information terminal 400 may also be limited to commodity transactions registered through the self-registration by the portable information terminal 400. In this case, if the selection of the 'view' button B2 is received in Act 76 (Act 76: Yes), the processor 401 sends a view request command containing the terminal ID to the electronic receipt server 80 (Act 82).

Further, in the foregoing embodiments, the store server 40 and the support server 50 are located in the retail store 100. Alternatively, the functions of both the store server 40 and the support server 50 may be integrated in one server. Further, the portable information terminal 400 is not necessarily carried by a customer 4. For example, the portable information terminal 400 may be replaced by an information terminal mounted on a shopping cart.

Further, in the foregoing embodiments, the electronic receipt server 80 stores the electronic receipt in the electronic receipt file 810 in association with an electronic receipt ID and a terminal ID. Alternatively, the electronic receipt server 80 may store the electronic receipt in the electronic receipt file 810 only in association with the terminal ID. That is, the electronic receipt may not be stored in association with an electronic receipt ID. In this case, the customer 4 using the electronic receipt system extracts the electronic receipt using the terminal ID of the portable information terminal 400. That is, the processor 501 may send the commodity data stored in the commodity transaction file 510, together with the terminal ID, to the POS apparatus 10 or 20 designated by the data input from the portable information terminal 400. When the terminal ID is associated with commodity data, the processor 101 associates the terminal ID with an electronic receipt and then sends the electronic receipt associated with the terminal ID to the electronic receipt server 80. When the terminal ID is associated with an electronic receipt received from the POS apparatus 10 or 20, the storage module stores the electronic receipt associated with the terminal ID.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity sales processing system comprising:
a point-of-sales (POS) terminal comprising:
a POS communication interface configured to receive commodity transaction data for a transaction, the commodity transaction data including price information of one or more commodities to be purchased by a customer and a first member ID of the customer for self-service commodity registration;
a user-operable payment interface configured to receive cash payment or payment information for the transaction; and
a POS processor configured to:
perform a settlement operation of the transaction using the commodity transaction data received by the POS communication interface and the cash payment or payment information received by the user-operable payment interface; and
after completion of the settlement operation, generate electronic receipt data of the transaction and control the POS communication interface to transmit the generated electronic receipt data along with the first member ID; and
an electronic receipt server comprising:
a communication interface configured to receive the electronic receipt data and the first member ID from the POS terminal;
a storage device configured to store a linkage table in which the first member ID is storable in association with a second member ID of the customer for electronic receipt service; and
a processor configured to:
upon the first member ID being received by the communication interface, obtain the second member ID associated with the first member ID from the linkage table in the storage device; and
store the electronic receipt data received by the communication interface in association with the second member ID in the storage device.

2. The commodity sales processing system according to claim 1, wherein the user-operable payment interface includes a cash receiving port configured to receive cash.

3. The commodity sales processing system according to claim 1, wherein the user-operable payment interface includes a card reader configured to read the payment information from a card.

4. The commodity sales processing system according to claim 1, wherein the POS terminal further includes a commodity code scanner on a first side of the POS terminal and a display on a second side of the POS terminal opposite to the first side.

5. The commodity sales processing system according to claim 4, wherein the POS terminal further includes a code symbol representing an ID of the POS terminal on the second side.

6. The commodity sales processing system according to claim 1, wherein
the user-operable payment interface is provided on a first side of the POS terminal, and
the POS terminal further includes a code symbol representing an ID of the POS terminal on the first side.

7. The commodity sales processing system according to claim 6, wherein the POS terminal includes no commodity code scanner.

8. The commodity sales processing system according to claim 1, wherein
the commodity transaction data also includes a linkage flag indicating whether or not the first member ID is associated with the second member ID, and
the POS processor is configured to:
after completion of the settlement operation, determine whether or not the first member ID is associated with the second member ID based on the linkage flag;
generate the electronic receipt data when determining that the first member ID is associated with the second member ID; and
cause a paper receipt to be printed, without generating the electronic receipt data, when determining that the first member ID is not associated with the second member ID.

9. The commodity sales processing system according to claim 1, further comprising:
a self-registration support server comprising:
a second communication interface configured to receive, from a mobile terminal of the customer, commodity data along with the first member ID and a POS ID along with the first member ID; and
a second processor configured to:
generate the commodity transaction data based on the commodity data received by the second communication interface; and
determine the received POS ID is an ID of the POS terminal and then control the second communication interface to transmit the generated commodity transaction data to the POS terminal.

10. The commodity sales processing system according to claim 9, wherein the processor of the electronic receipt server is further configured to control the communication interface to transmit the electronic receipt data to the mobile terminal.

11. A commodity sales processing system comprising:
a point-of-sales (POS) terminal comprising:
a POS communication interface configured to receive commodity transaction data for a transaction, the commodity transaction data including price information of one or more commodities to be purchased by a customer and a first member ID of the customer for self-service commodity registration;
a user-operable payment interface configured to receive cash payment or payment information for the transaction;
a storage device configured to store a linkage table in which the first member ID is storable in association with a second member ID of the customer for electronic receipt service; and
a POS processor configured to:
perform a settlement operation of the transaction using the commodity transaction data received by the POS communication interface and the cash payment or payment information received by the user-operable payment interface;
after completion of the settlement operation, obtain the second member ID associated with the first member ID from the linkage table in the storage device and then generate electronic receipt data of the transaction; and
control the POS communication interface to transmit the generated electronic receipt data along with the obtained second member ID; and
an electronic receipt server comprising:
a communication interface configured to receive the electronic receipt data and the second member ID from the POS terminal; and
a processor configured to store the electronic receipt data received by the communication interface in association with the received second member ID in a storage device.

12. The commodity sales processing system according to claim 11, wherein the user-operable payment interface includes a cash receiving port configured to receive cash.

13. The commodity sales processing system according to claim 11, wherein the user-operable payment interface includes a card reader configured to read the payment information from a card.

14. The commodity sales processing system according to claim 11, wherein the POS terminal further includes a commodity code scanner on a first side of the POS terminal and a display on a second side of the POS terminal opposite to the first side.

15. The commodity sales processing system according to claim 14, wherein the POS terminal further includes a code symbol representing an ID of the POS terminal on the second side.

16. The commodity sales processing system according to claim 11, wherein
the user-operable payment interface is provided on a first side of the POS terminal, and
the POS terminal further includes a code symbol representing an ID of the POS terminal on the first side.

17. The commodity sales processing system according to claim 16, wherein the POS terminal includes no commodity code scanner.

18. The commodity sales processing system according to claim 11, wherein
the commodity transaction data also includes a linkage flag indicating whether or not the first member ID is associated with the second member ID, and
the POS processor is configured to:
after completion of the settlement operation, determine whether or not the first member ID is associated with the second member ID based on the linkage flag;

generate the electronic receipt data when determining that the first member ID is associated with the second member ID; and cause a paper receipt to be printed, without generating the electronic receipt data, when determining that the first member ID is not associated with the second member ID.

19. The commodity sales processing system according to claim 11, further comprising:

a self-registration support server comprising:

a second communication interface configured to receive, from a mobile terminal of the customer, commodity data along with the first member ID and a POS ID along with the first member ID; and a second processor configured to:

generate the commodity transaction data based on the commodity data received by the second communication interface; and determine the received POS ID is an ID of the POS terminal and then control the second communication interface to transmit the generated commodity transaction data to the POS terminal.

20. The commodity sales processing system according to claim 19, wherein the processor of the electronic receipt server is further configured to control the communication interface to transmit the electronic receipt data to the mobile terminal.

* * * * *